(12) United States Patent
Gun et al.

(10) Patent No.: US 12,051,325 B2
(45) Date of Patent: Jul. 30, 2024

(54) METHOD AND APPARATUS FOR COORDINATING MULTIPLE COOPERATIVE VEHICLE TRAJECTORIES ON SHARED ROAD NETWORKS

(71) Applicant: Technological Resources Pty. Limited, Melbourne (AU)

(72) Inventors: Philip Gun, Sydney (AU); Andrew John Hill, Sydney (AU); Robin Vujanic, Sydney (AU); Steven John Scheding, Sydney (AU)

(73) Assignee: TECHNOLOGICAL RESOURCES PTY LIMITED, Melbourne (AU)

( * ) Notice: Subject to any disclaimer, the term of this patent is extended or adjusted under 35 U.S.C. 154(b) by 0 days.

(21) Appl. No.: 18/022,634

(22) PCT Filed: Aug. 27, 2021

(86) PCT No.: PCT/AU2021/050987
§ 371 (c)(1),
(2) Date: Feb. 22, 2023

(87) PCT Pub. No.: WO2022/040748
PCT Pub. Date: Mar. 3, 2022

(65) Prior Publication Data
US 2023/0230475 A1 Jul. 20, 2023

(30) Foreign Application Priority Data
Aug. 27, 2020 (AU) .................... 2020903061

(51) Int. Cl.
*G08G 1/01* (2006.01)
*G08G 1/0967* (2006.01)

(52) U.S. Cl.
CPC ......... *G08G 1/0145* (2013.01); *G08G 1/0112* (2013.01); *G08G 1/0125* (2013.01); *G08G 1/096725* (2013.01)

(58) Field of Classification Search
CPC .. G08G 1/0145; G08G 1/0112; G08G 1/0125; G08G 1/096725
See application file for complete search history.

(56) References Cited

U.S. PATENT DOCUMENTS 9,940,834 B1 * 4/2018 Konrardy ............... G08G 1/165
10,112,595 B2 * 10/2018 Naserian ............... B60W 20/12
(Continued)

FOREIGN PATENT DOCUMENTS

KR 10-2019-0103345 A 9/2019

OTHER PUBLICATIONS

Dec. 14, 2021—(WO) International Search Report and Written Opinion—Appl. PCT/AU2021/050987.
(Continued)

*Primary Examiner* — Luis A Martinez Borrero
(74) *Attorney, Agent, or Firm* — Banner & Witcoff, Ltd.

(57) ABSTRACT

A vehicle coordination system is provided for coordinating the trajectories of vehicles on a road network. The vehicle coordination system comprises a plurality of vehicles each having respective vehicle position tracking assemblies that are in communication with respective vehicle communication systems for transmitting vehicle state messages including positions of the vehicles. A task assignment allocator is provided that is arranged to generate task assignments for each of the plurality of vehicles, including destinations in the road network for the vehicles. A vehicle coordination assembly is in communication with the vehicle communication systems via a data network for receiving the vehicle state messages. The vehicle coordination assembly is configured
(Continued)

to determine respective paths for each vehicle to arrive at their respective destinations and determine trajectory control commands for each vehicle to traverse their respective paths whilst optimizing a predetermined objective and avoiding active interactions of two or more of the vehicles occurring in any shared areas of the paths. The vehicle coordination assembly is configured to transmit the trajectory control commands to each vehicle. The predetermined objective may be an aggregate traversal time for the vehicles.

20 Claims, 20 Drawing Sheets

(56) References Cited

U.S. PATENT DOCUMENTS

| | | | |
|---|---|---|---|
| 10,134,278 B1* | 11/2018 | Konrardy | G08G 1/166 |
| 10,185,327 B1* | 1/2019 | Konrardy | B60R 21/0136 |
| 10,308,246 B1* | 6/2019 | Konrardy | G01C 21/3415 |
| 10,384,678 B1* | 8/2019 | Konrardy | G05D 1/0295 |
| 10,991,242 B2* | 4/2021 | Taylor | H04Q 9/00 |
| 11,124,186 B1* | 9/2021 | Konrardy | H04L 67/306 |
| 11,242,051 B1* | 2/2022 | Konrardy | B60W 30/18163 |
| 11,600,177 B1* | 3/2023 | Konrardy | G05D 1/227 |
| 11,645,696 B2* | 5/2023 | Ferguson | G07C 9/00896 701/516 |
| 11,879,742 B2* | 1/2024 | Konrardy | G06F 30/15 |
| 2002/0143461 A1 | 10/2002 | Burns et al. | |
| 2009/0099898 A1* | 4/2009 | Ehrman | G06Q 10/06 705/7.15 |
| 2010/0094481 A1 | 4/2010 | Anderson | |
| 2010/0256836 A1* | 10/2010 | Mudalige | G08G 1/164 701/25 |
| 2010/0256852 A1* | 10/2010 | Mudalige | G08G 1/164 701/24 |
| 2013/0278443 A1* | 10/2013 | Rubin | G08G 1/096791 340/905 |
| 2014/0074339 A1* | 3/2014 | Casado | G05D 1/104 701/24 |
| 2015/0200712 A1* | 7/2015 | Cooper | H04L 12/40169 375/257 |
| 2015/0217790 A1* | 8/2015 | Golden | B60T 17/228 701/19 |
| 2015/0286219 A1 | 10/2015 | Reichel et al. | |
| 2016/0194014 A1* | 7/2016 | Rajendran | B61L 27/70 701/2 |
| 2016/0231746 A1* | 8/2016 | Hazelton | G05D 1/0257 |
| 2016/0321924 A1* | 11/2016 | Lewis | B60W 40/109 |
| 2016/0359741 A1* | 12/2016 | Cooper | H04W 4/44 |
| 2017/0025020 A1 | 1/2017 | Liao et al. | |
| 2017/0059336 A1 | 3/2017 | Huang et al. | |
| 2017/0248963 A1 | 8/2017 | Levinson et al. | |
| 2017/0323194 A1* | 11/2017 | Wang | G06N 5/01 |
| 2017/0344023 A1* | 11/2017 | Laubinger | B60W 30/165 |
| 2018/0126976 A1* | 5/2018 | Naserian | B60W 10/06 |
| 2018/0259976 A1* | 9/2018 | Williams | G05D 1/0027 |
| 2018/0336780 A1 | 11/2018 | Ran et al. | |
| 2019/0012909 A1* | 1/2019 | Mintz | G06Q 30/0206 |
| 2019/0016312 A1* | 1/2019 | Carlson | G05D 1/0088 |
| 2019/0025817 A1* | 1/2019 | Mattingly | G06Q 10/08 |
| 2019/0025818 A1* | 1/2019 | Mattingly | H04L 67/1051 |
| 2019/0025819 A1* | 1/2019 | Ferguson | G08G 1/0145 |
| 2019/0026886 A1* | 1/2019 | Ferguson | G08G 1/148 |
| 2019/0035282 A1* | 1/2019 | Ferguson | G07C 5/02 |
| 2019/0311616 A1* | 10/2019 | Jin | G05D 1/0297 |
| 2020/0057453 A1* | 2/2020 | Laws | G05D 1/0295 |
| 2020/0120458 A1* | 4/2020 | Aldana | H04W 72/23 |
| 2020/0126428 A1 | 4/2020 | Tonosaki | |
| 2020/0183416 A1* | 6/2020 | Cheng | H04L 67/12 |
| 2020/0234582 A1* | 7/2020 | Mintz | G08G 1/096811 |
| 2020/0294394 A1* | 9/2020 | Guo | G08G 1/096783 |
| 2020/0394922 A1* | 12/2020 | Gardner | G08G 1/096811 |
| 2021/0094376 A1* | 4/2021 | Smith | G06Q 10/087 |
| 2021/0114554 A1* | 4/2021 | Chen | G07C 5/0825 |
| 2021/0171024 A1* | 6/2021 | Grigorescu | B60W 60/0027 |
| 2021/0294350 A1* | 9/2021 | Konrardy | G05D 1/0255 |
| 2021/0302974 A1* | 9/2021 | Di Cairano | G01C 21/3658 |
| 2021/0339704 A1* | 11/2021 | Rathi | B60R 16/0231 |
| 2022/0055654 A1* | 2/2022 | Luan | G01S 5/0284 |
| 2022/0126864 A1* | 4/2022 | Moustafa | B60W 30/182 |
| 2022/0156665 A1* | 5/2022 | Beth | G05D 1/0276 |
| 2023/0154321 A1* | 5/2023 | Konrardy | G07C 9/00563 340/905 |

OTHER PUBLICATIONS

Apr. 24, 2023—(AU) Examination Report—App 2021334408.
Apr. 12, 2023—(CA) Examination Report—App 3193121.
Hu, Wu-Chih, et al., "Optimal Route Planning System for Logistics Vehicles Based on Artificial Intelligence," Journal of Internet Technology vol. 21 (2020) No. 3, pp. 757-764.
Korcyl, Antoni, et al., "A MILP Model fo the Municipal Solid Waste Selective Collection Routing Problem," Decision Making in Manufacturing and Services, vol. 13 (2019) No. 1-2, pp. 17-35.
Hou, Yunfei, et al., "TASeT: Improving the Efficiency of Electric Taxis With Transfer-Allowed Rideshare," IEEE Transactions on Vehicular Technology, vol. 65, No. 12, Dec. 2016, pp. 9518-9528.
Apr. 10, 2024—(AU) Examination Report—2021334408.
Gun, Philip, Hill, Andrew, and Vujanic, Robin, "Multi-Vehicle Trajectory Optimisation On Road Networks," 2019 International Conference on Robotics and Automation (ICRA), Montreal, Canada, May 20-24, 2019, pp. 2025-2031.
Mar. 8, 2024—(AU) Examination Report—App 2021334408.
Basile, D. et al., "Dependable Dynamic Routing for Urban Transport Systems Through Integer Linear Programming", International Conference on Reliability, Safety and Security of Railway Systems, RSSRail 2017: Reliability, Safety, and Security of Railway Systems. Modelling, Analysis, Verification, and Certification, pp. 221-237, first published online: Oct. 19, 2017.
Rahili, S. et al., "Optimal Routing for Autonomous Taxis using Distributed Reinforcement Learning," 2018 IEEE International Conference on Data Mining Workshops (ICDMW), Nov. 17-20, 2018, Singapore.

* cited by examiner

METHOD AND APPARATUS FOR COORDINATING MULTIPLE COOPERATIVE VEHICLE TRAJECTORIES ON SHARED ROAD NETWORKS

CROSS-REFERENCE TO RELATED APPLICATIONS

This application is a U.S. National Stage application under 35 U.S.C. § 371 of International Application PCT/AU2021/050987 (published as WO 2022/040748 A1), filed on Aug. 27, 2021, which claims the benefit of priority to Australian Application No. 2020903061, filed on Aug. 27, 2020, and each of these prior applications is hereby incorporated by reference in its entirety.

TECHNICAL FIELD

The present disclosure relates to coordinating the trajectories of vehicles as they cross a shared road network whilst ensuring collision avoidance and optimizing an overall objective, such as minimizing aggregated traversal time for all vehicles.

BACKGROUND ART

Any references to methods, apparatus or documents of the prior art are not to be taken as constituting any evidence or admission that they formed, or form part of the common general knowledge.

Embodiments of the invention apply to the coordination of vehicles on road networks in general but will be primarily explained in the context of coordinating haul trucks on a road network in a mine environment. Mine road networks connect various stations in a mining environment where raw material is extracted, stored or processed. Multiple vehicles, typically in the form of haul trucks simultaneously transport material such as iron ore between various locations. Mine road networks typically include many roads, and intersections where vehicles regularly interact during traversal.

It is highly desirable to operate the vehicles in a manner that optimises a desired objective. For example, the objective may be to minimize one of energy consumption; wait times of machinery at destinations; and queues at destinations; maximisation of material extraction rates. Where it is desired to maximise material extraction rates for example, haul trucks travel in paths across the road network in an attempt to complete allocated task assignments in minimal time, usually travelling at maximum safe speed. In practice, task assignments are allocated with little consideration of how each trucks' actions will affect each other truck, beyond that which is required to ensure safety locally.

A major part of planning trajectories for a vehicle to perform an assignment involves a driver or machine controller of a vehicle making local decisions in response to interactions with other vehicles. However, interdependencies between vehicles mean that these decisions can have complex flow-on effects on multiple other vehicles.

It would be desirable if a solution were provided that coordinates the movement of several vehicles to avoid active interactions, such as conflicts and collisions, occurring within a given road network whilst each of the vehicles performs allocated task assignments.

SUMMARY OF THE INVENTION

According to a first aspect of the present invention there is provided a vehicle coordination system arranged to coordinate trajectories of vehicles on a road network, the vehicle coordination system comprising:
a plurality of vehicles each having respective vehicle position tracking assemblies in communication with respective vehicle communication systems arranged to transmit vehicle state messages including positions of the vehicles;
a task assignment allocator arranged to generate task assignments assigning tasks to each of the plurality of vehicles, the task assignments including destinations in the road network for the vehicles;
a vehicle coordination assembly in communication with the respective vehicle communication systems via a data network for receiving the vehicle state messages, the vehicle coordination assembly configured to:
determine paths for each vehicle to arrive at their destinations;
determine trajectory control commands to cause each vehicle to traverse their respective paths whilst optimizing a predetermined objective and avoiding active interactions of two or more of the vehicles occurring in shared areas of the paths; and
transmit the trajectory control commands to each vehicle.

In an embodiment the vehicle coordination assembly is further configured to identify the shared areas of the paths.

In an embodiment the vehicle coordination assembly is configured to determine respective minimum length paths for each vehicle to arrive at their respective destinations.

The predetermined objective may be to minimize an aggregated traversal time of all vehicles in performance of the task assignments.

In other embodiments the predetermined objective may be one or more of: minimizing energy consumption of the vehicles; minimizing wait times of machinery at the destinations; minimizing formation of vehicle queues at the destinations.

In an embodiment the respective trajectory control commands comprise acceleration commands.

In an embodiment the respective vehicles are configured to respond to the acceleration commands through operation of propulsion systems and braking systems thereof.

The vehicles may include driverless vehicles, each including propulsion and braking systems that are each in communication with the vehicle communication system for applying positive and negative acceleration to the vehicle.

The driverless vehicles may each include steering systems that are configured to steer said vehicles along their respective paths.

The vehicles may be arranged for operation by drivers wherein each said vehicle includes a Human-Machine-Interface responsive to the vehicle control system to present respective trajectory control messages to respective drivers.

The task assignment allocator may be arranged to transmit the task assignments for each of the plurality of vehicles to the vehicle coordination assembly via the data network.

In an embodiment the predetermined objective comprises an objective of an optimization model.

The optimization model may be in the form of a Mixed Integer Linear Programming (MILP) discrete time model that encompasses the road network.

In an embodiment the MILP includes binary variables for modelling the interaction of the vehicles with the shared areas.

In an embodiment the MILP includes state variables for modelling relative positions of pairs of the vehicles.

In an embodiment the shared areas of the paths comprise intersections of the road network.

In an embodiment the shared areas of the paths comprise sub-paths along the road network.

In an embodiment the MILP model includes binary variables for ensuring that the predetermined objective is optimized without said active interactions occurring.

In an embodiment the binary variables are associated with half-spaces corresponding to conflict borders about the shared spaces.

In an embodiment the half-spaces are defined based on vehicle locations relative to the shared areas. Preferably the half-spaces are defined in a coordination space, which combines vehicle locations along their paths into a joint space representation.

In an embodiment the vehicle locations relative to the shared areas include one or more of locations where: the vehicle starts merging into the sub-path; the vehicle is merged entirely inside the sub-path or intersection; the vehicle starts diverging from the sub-path; the vehicle is diverged entirely from the sub-path or intersection; the vehicle's goal location.

In an embodiment the optimization model is modified for solution complexity reduction based on a first procedure that computes sub-optimal controls for the vehicle control commands by reducing decision making frequency to reduce the resolution of the binary variables while maintaining the resolution of the continuous state variables.

In an embodiment the first procedure equalizes the values of binary variables that are adjacent in time to thereby keep a joint position of two vehicles in the same half-spaces across a range of adjacent time steps.

In an embodiment the first procedure applies a higher discrete time resolution to the binary variables when a joint trajectory of the two vehicles is adjacent a transition between different half-spaces.

In an embodiment the first procedure implements a non-uniform resolution with short intervals around estimated merging and diverging stages and long intervals elsewhere.

In an embodiment the timing of the interaction stages is estimated from the solution of a further multi-vehicle trajectory planner.

In an embodiment the optimization model is modified for solution complexity reduction based on a second procedure that computes sub-optimal controls by using a predetermined order of travel for the vehicles.

In an embodiment the second procedure pre-sets values of at least some of the binary variables prior to optimizing the predetermined objective.

In an embodiment the second procedure comprises a first stage which selects vehicle travel orders.

In an embodiment the second procedure comprises a second stage that uses the travel orders from the first stage and combines them in a single optimization model with a reduced number of discrete decisions required.

In an embodiment the second procedure pre-sets said binary variables to force one vehicle to be ahead of another vehicle at one or more steps along their respective paths.

In an embodiment the vehicle coordination assembly is configured to implement an iterative lazy interaction constraint MILP procedure for optimization complexity reduction.

In an embodiment the iterative lazy interaction constraint MILP procedure comprises the steps of:
updating the optimization model by removing collision constraints therefrom;
solving the optimization model to determine vehicle trajectories;
identifying active shared areas of the vehicle trajectories;
repeating:
calculating a sequence of time steps to apply collision avoidance constraints based on active shared areas;
updating the optimization model by adding avoidance constraints thereto;
optimizing the optimization model to produce updated vehicle trajectories;
identify active shared areas of the updated vehicle trajectories; until:
no active shared areas are present in the updated vehicle trajectories.

In an embodiment the vehicle coordination assembly is configured to implement a predictive lazy constraint procedure for calculating the sequence of time steps to apply collision avoidance constraints.

In an embodiment the predictive lazy constraint procedure includes iteratively making active shared areas inactive by modifying one vehicle trajectory while others remain unchanged.

According to a further aspect of the present invention there is provided a method for coordinating the trajectories of vehicles on a road network, the method comprising:
monitoring positions of a plurality of vehicles via a data network;
receiving task assignments for each of the plurality of vehicles, said task assignments including destinations in the road network for the vehicles;
processing the task assignments and said positions with reference to topology of the road network to thereby generate paths for each vehicle;
determining trajectory control commands for each vehicle to traverse its respective path whilst optimizing a predetermined objective and without active interactions of two or more of the vehicles occurring in areas shared by the paths; and
transmitting the trajectory control commands across the data network to each vehicle for controlling motion thereof.

In an embodiment the method includes processing the paths to identify areas shared by the paths.

In an embodiment the method includes determining respective minimum length paths for each vehicle to arrive at their respective destinations.

In an embodiment the predetermined objective is for minimizing an aggregated traversal time of all vehicles in performance of the task assignments.

In other embodiments the predetermined objective may be one or more of: minimizing energy consumption of the vehicles; minimizing wait times of machinery at the destinations; minimizing formation of vehicle queues at the destinations.

In an embodiment the respective trajectory control commands comprise acceleration commands.

In an embodiment the task assignments are received from a task assignment allocator via the data network.

In an embodiment the predetermined objective comprises an objective of an optimization model.

The optimization model may comprise a Mixed Integer Linear Programming (MILP) discrete time optimization model that encompasses the road network.

In an embodiment the MILP includes binary variables for modelling the interaction of the vehicles with the shared areas.

In an embodiment the MILP includes state variables that model relative positions of pairs of the vehicles.

In an embodiment the shared areas of the paths comprise intersections of the road network.

In an embodiment the shared areas of the paths comprise sub-paths along the road network.

In an embodiment the MILP model includes binary variables for ensuring that the predetermined objective is optimized without said active interactions occurring.

In an embodiment the binary variables are associated with half-spaces corresponding to conflict borders about the shared spaces.

In an embodiment the half spaces are defined based on vehicle locations relative to the shared areas.

In an embodiment the vehicle locations relative to the shared areas include one or more of locations where: the vehicle starts merging into the sub-path; the vehicle is merged entirely inside the sub-path or intersection; the vehicle starts diverging from the sub-path; the vehicle is diverged entirely from the sub-path or intersection; the vehicle's goal location.

In an embodiment the method includes modifying the optimization model for solution complexity reduction by implementing a first procedure that computes sub-optimal controls by reducing decision making frequency to reduce the resolution of the binary variables while maintaining the resolution of the continuous state variables.

In an embodiment the first procedure equalizes the values of binary variables that are adjacent in time to thereby keep the joint position of two vehicles in the same half-spaces across a range of adjacent time steps.

In an embodiment the first procedure applies a higher discrete time resolution to the binary variables when a joint trajectory of two vehicles is adjacent a transition between different half-spaces.

In an embodiment the first procedure implements a non-uniform resolution with short intervals around estimated merging and diverging stages and long intervals elsewhere.

In an embodiment the timing of the interaction stages is estimated from the solution of a further multi-vehicle trajectory planner.

In an embodiment the method includes modifying the optimization model for solution complexity reduction by implementing a second procedure that computes sub-optimal controls by using a predetermined order of travel for the vehicles.

In an embodiment the second procedure pre-sets values of at least some of the binary variables prior to optimizing the predetermined objective.

In an embodiment the second procedure comprises a first stage which selects vehicle travel orders.

In an embodiment the second procedure comprises a second stage that uses the travel orders from the first stage and combines them in a single optimization model with a reduced number of discrete decisions required.

In an embodiment the second procedure pre-sets said binary variables to force one vehicle to be ahead of another vehicle at one or more steps along their respective paths.

In an embodiment the method includes implementation of an iterative lazy interaction constraint MILP procedure for optimization complexity reduction.

In an embodiment the iterative lazy interaction constraint MILP procedure comprises the steps of:
  updating the optimization model by removing collision constraints therefrom;
  solving the optimization model to determine vehicle trajectories;
  identifying active shared areas of the vehicle trajectories;
  repeating:
    calculating a sequence of time steps to apply collision avoidance constraints based on active shared areas;
    updating the optimization model by adding avoidance constraints thereto;
    optimizing the optimization model to produce updated vehicle trajectories;
    identify active shared areas of the updated vehicle trajectories; until:
    no active shared areas are present in the updated vehicle trajectories.

In an embodiment the method includes performing a predictive lazy constraint procedure for calculating the sequence of time steps to apply collision avoidance constraints.

In an embodiment the predictive lazy constraint procedure includes iteratively making active shared areas inactive by modifying one vehicle trajectory while others remain unchanged.

According to another aspect of the present invention there is provided a computer system that is programmed with a software product comprising instructions for execution by one or more processors of the computer system to perform the method for coordinating the trajectories of vehicles on a road network.

According to another aspect of the present invention there is provided a media bearing non-transitory, tangible, machine readable instructions for one or more processors of a computer system to perform the method for coordinating the trajectories of vehicles on a road network.

According to a further aspect of the present invention there is provided a method for for coordinating the trajectories of vehicles on a road network, the method comprising:
  processing paths for the vehicles to complete tasks assigned thereto to determine trajectory control commands for each vehicle to traverse its respective path whilst optimizing a predetermined objective and without active interactions of two or more of the vehicles occurring in areas shared by the paths; and
  transmitting the trajectory control commands across the data network to each vehicle for controlling motion thereof;
  wherein computational complexity in optimizing the predetermined objective is reduced by:
  grouping time adjacent binary variables that model interactions of the two or more vehicles in shared areas; or
  implementing an iterative lazy interaction constraint procedure.

According to another aspect there is provided a method for coordinating trajectories of vehicles on a road network, the method comprising:
  processing paths for the vehicles to complete tasks assigned thereto to determine trajectory control commands for each vehicle to traverse its respective path whilst optimizing a predetermined objective and without active interactions of two or more of the vehicles occurring in areas shared by the paths; and
  transmitting the trajectory control commands across a data network to each vehicle for controlling motion thereof;
  wherein computational complexity in optimizing the predetermined objective is reduced by:
  grouping time adjacent binary variables modelling interactions of the two or more vehicles in shared areas; or
  predetermining an order of travel for the vehicles prior to optimizing the predetermined objective; or implementing an iterative lazy interaction constraint procedure.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

1. Mining Environment and Vehicle Configuration

Figure 1:
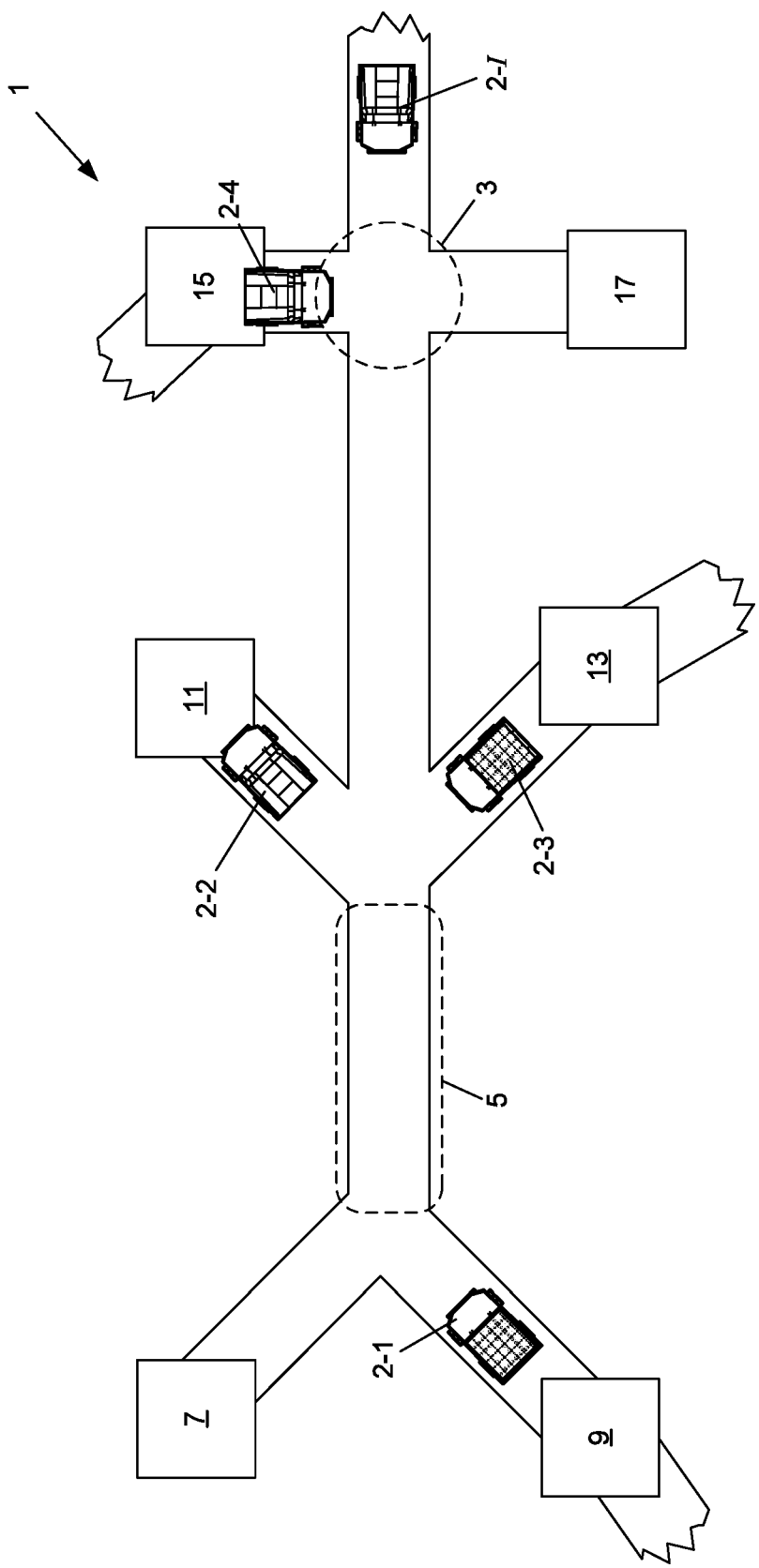
FIG. 1 depicts a portion of a road network including shared areas being a sub-path and an intersection in which active and inactive vehicle interactions can occur.

FIG. 1 stylistically depicts a portion of a road network 1 of a mining environment, in which systems, methods and apparatus according to embodiments of the invention can be implemented. In the mining environment vehicles such as mine haul trucks 2-1, . . . , 2-I traverse the road network 1 in order to perform hauling tasks, for example, by moving material between stations. The stations may include various operational sites such as a crusher site 7, a loading site 9, a dump site 11, a shipping site 13, a stockpile site 15 and a maintenance site 17. In performing their tasks the mine haul trucks 2-1, . . . , 2-I travel along paths over the road network through shared areas such as intersections, e.g. intersection 3 and across shared road segments, e.g. segment 5.

Figure 2:
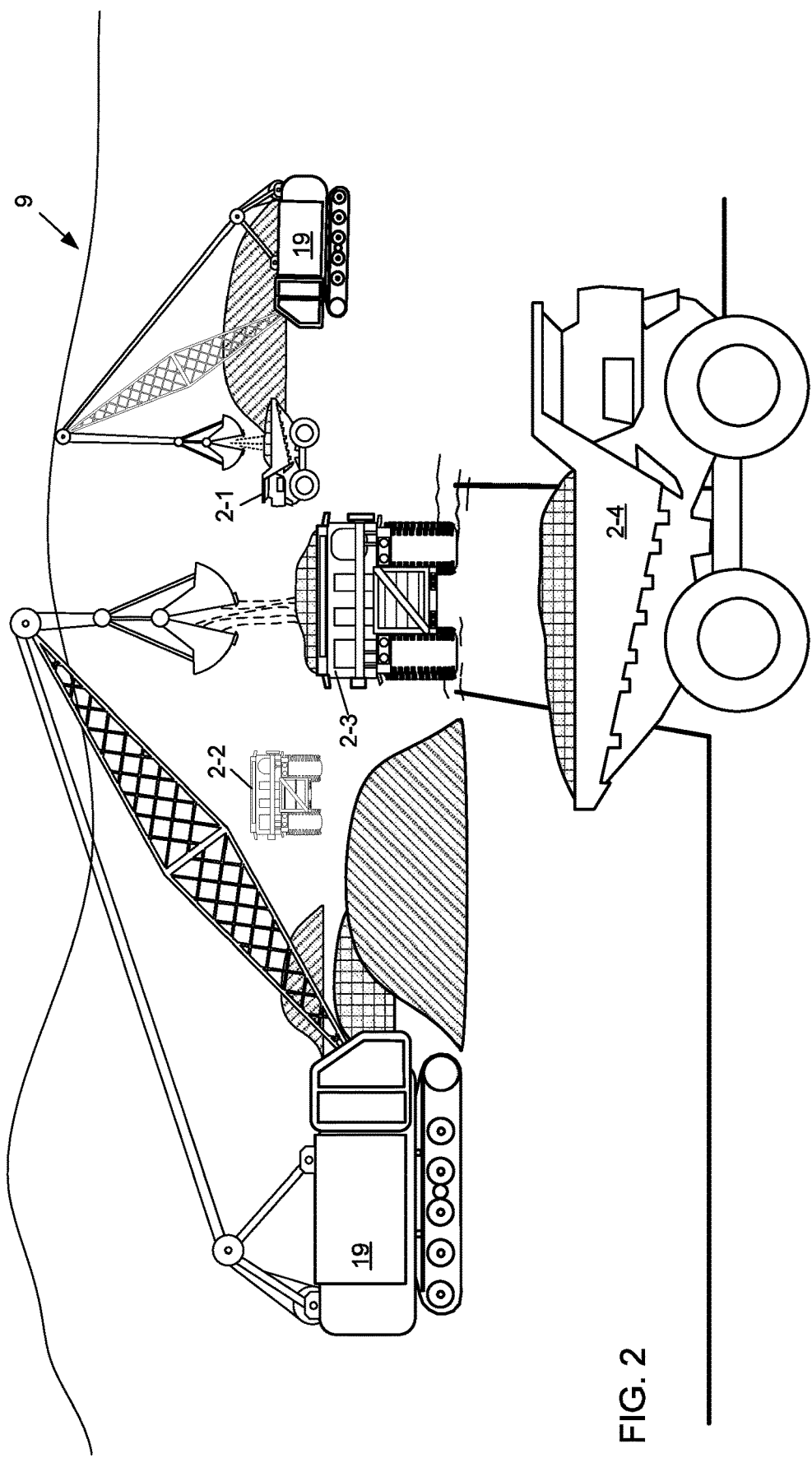
FIG. 2 depicts vehicles at a task assignment destination.
Figure 3:
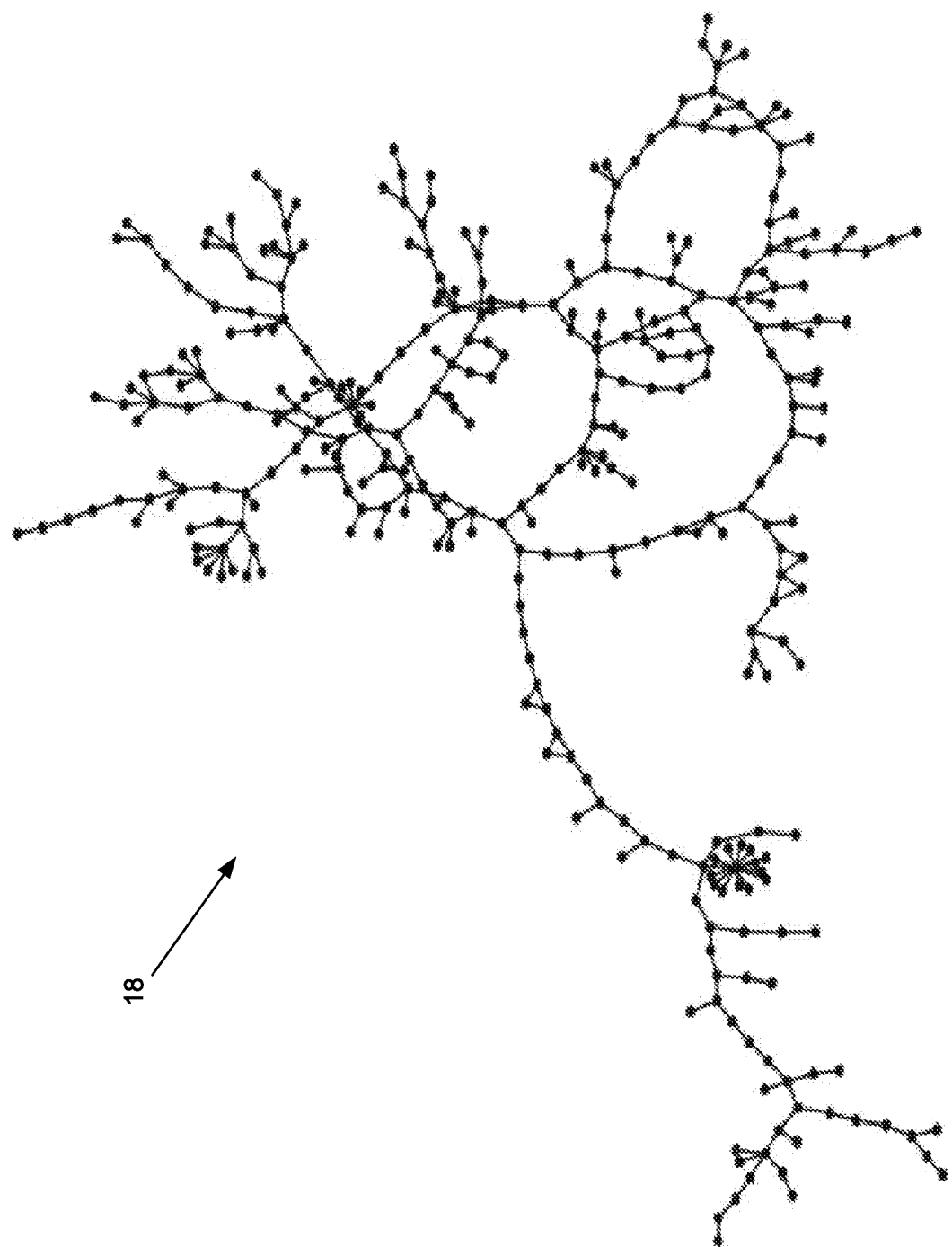
FIG. 3 is a graph of nodes and edges reflecting topology of a road network.

FIG. 2 depicts haul trucks 2-1, 2-2, 2-3, 2-4 at an example operational site in the form of a loading site 9 wherein the haul trucks are loaded with material by loaders 19. FIG. 3 is a topologically equivalent graph 83 of the entire road network 1 of the mining environment showing many roads (as edges) and intersections (as dots) which vehicles such as the haul trucks 2-1, . . . , 2-I regularly traverse during performance of their task assignments.

Figure 4:
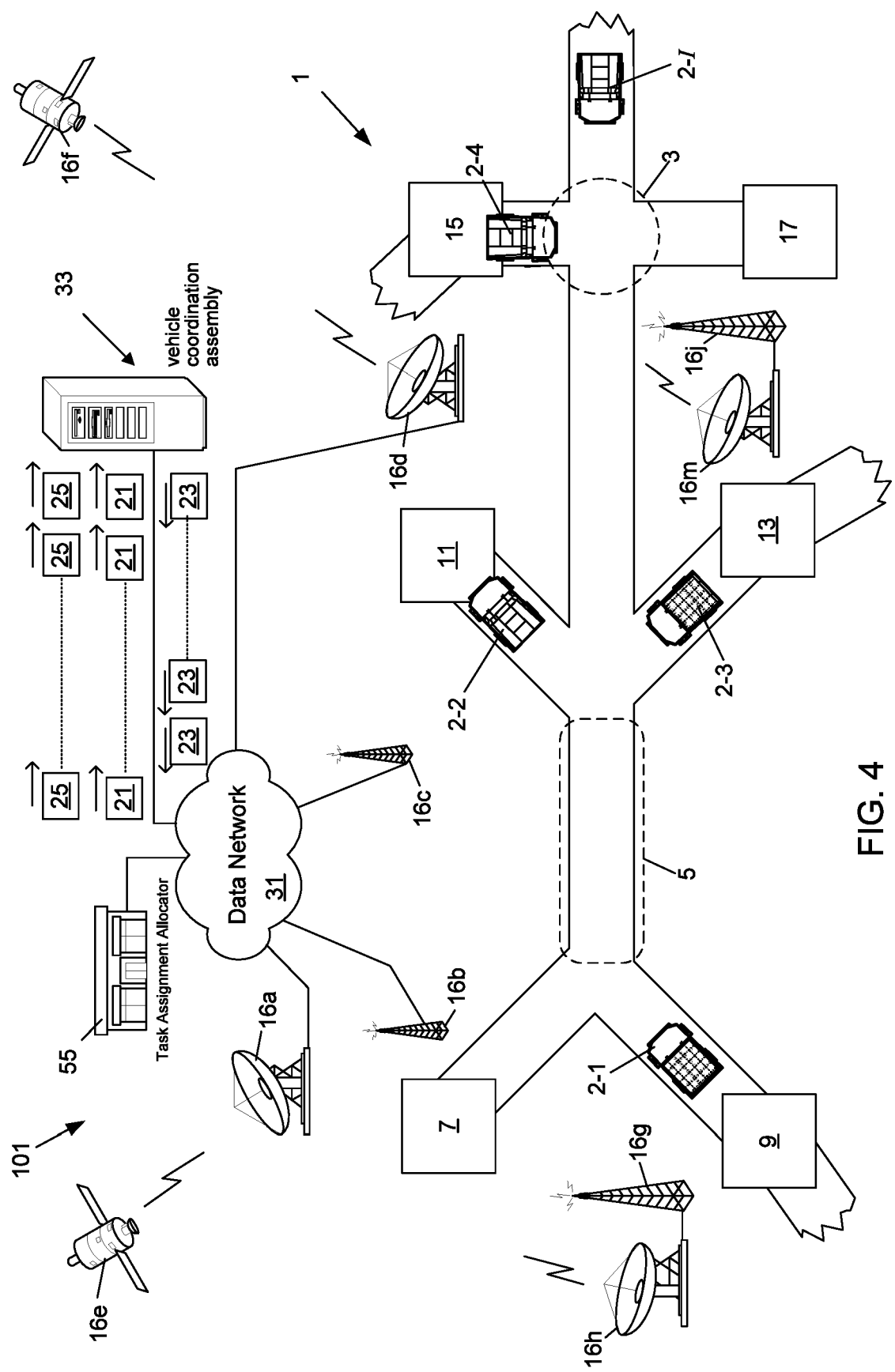
FIG. 4 is a block diagram of a system according to an embodiment of the present disclosure.

Referring now to FIG. 4, a vehicle coordination system 101 according to an embodiment of the present invention is illustrated. System 101 includes a data network 31 for placing a communication system of each haul truck 2-1, . . . , 2-I in data communication with a vehicle coordination assembly 33. The data network 31 includes a collection of wireless data transceivers 16a, . . . , 16m including satellite and terrestrial transceivers suitable for implementing wireless communication protocols such as WiFi, WiMax, GPRS, EDGE or equivalent terrestrial and satellite wireless data communications. It will be appreciated that these network architectures are provided as examples only and thus are not limiting.

Each vehicle in the mine environment can be equipped with an array of navigation, communication, and data gathering equipment that assist the vehicle's operator or which in some cases render the vehicle totally autonomous to the extent of the vehicle being driverless or being driven remotely.

Figure 5:
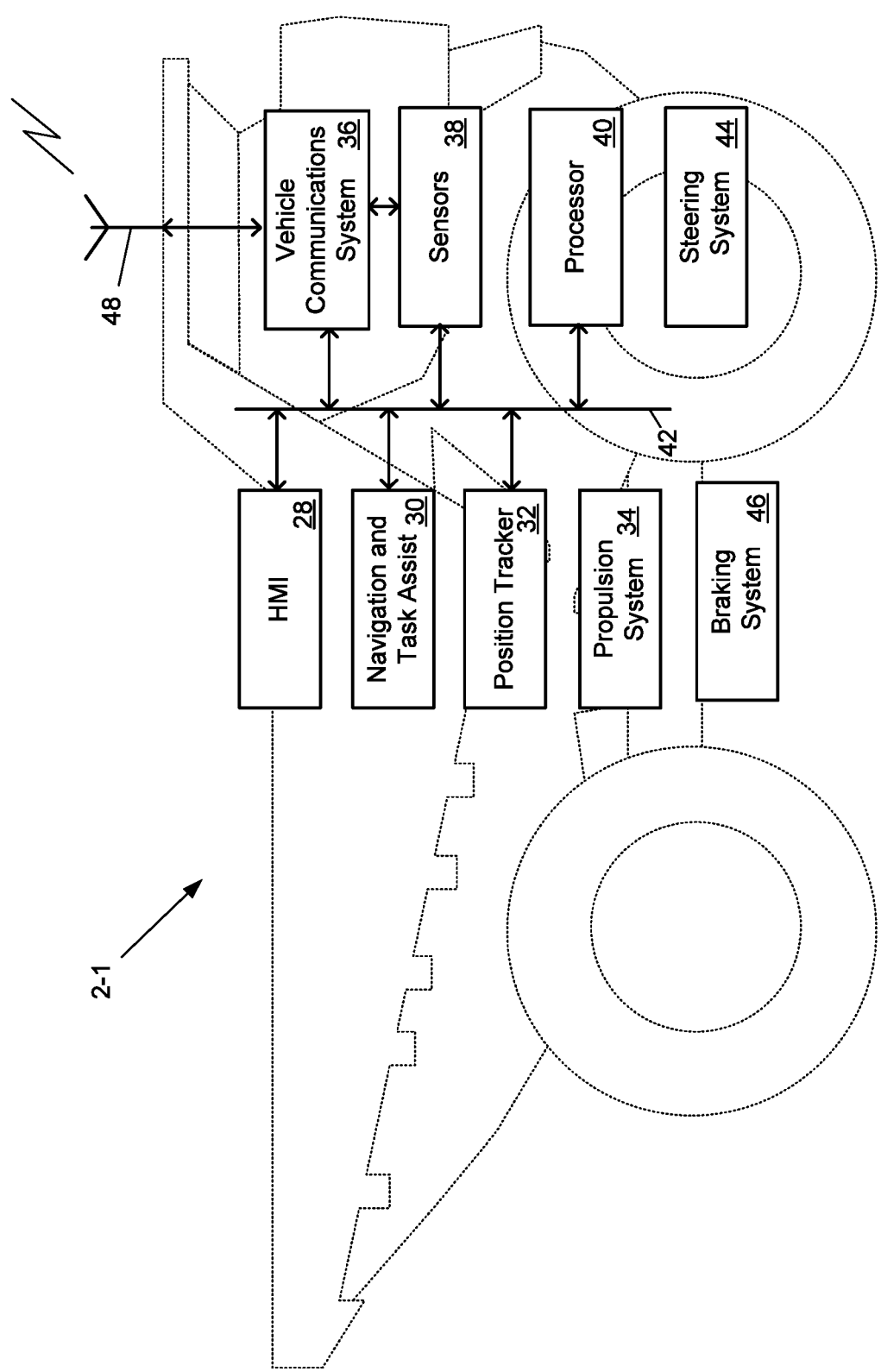
FIG. 5 is a block diagram of a driver operated vehicle of the system.

FIG. 5 presents a block diagram of an embodiment of a haul truck 2-1 that is operated by a driver. Vehicle 2-1 includes a data bus 42 which facilitates electronic data communication between a processor 40 which is configured to coordinate interactions between a number of assemblies 28, 30, 32, 36 and 38. A Human-Machine-Interface (HMI) 28 is provided which may be a suitably programmed mobile computing device, for example, a tablet personal computer or a personal digital assistant. Alternatively the HMI 28 may comprise a mobile industrial computer with screen and operator interface for implementing the present system.

Haul truck 2-1 also includes a position tracker 32, for example a Global Positioning System (GPS) receiver which is configured to generate information about the time-varying position, orientation, and speed of the vehicle. The position tracker may also triangulate a position estimate from terrestrial transmitters such as wireless transceivers 16b, 16c, 16j and 16g of FIG. 4. The position tracker 32 may also include gyroscopes or other inertial navigation apparatus that can also be used to generate signals indicating the location of vehicle 2-1 within the mine environment and to ascertain the vehicles orientation, velocity and acceleration. The haul truck 2-1 also includes a sensor assembly 38 which may include sensors for gauging the weight of the load being hauled, brake condition, steering angle, wheel rotation speed, fuel level, engine temperature, tyre pressure, driver fatigue and radar and/or LiDAR sensors for estimating obstacle proximity.

Vehicle 2-1 also includes a navigation and task assist assembly 30 which generates map and direction data that it displays on the HMI 28 to assist the driver to operate the vehicle to complete task assignments. In use the driver refers to information displayed on the HMI 28 and then operates the propulsion system 34, power steering system 44 and braking system 46 accordingly. For example, the HMI may describe a path to be driven and also present vehicle trajectory control commands from vehicle coordination assembly 33, to be applied whilst driving over the path. The control commands may be in the form of acceleration requirements to be implemented at certain steps along the path in order to avoid interaction with other vehicles performing their task assignments.

Vehicle 2-1 also includes a vehicle communications system 36 which is coupled to an antenna 48 for transmitting radio frequency data communications to the data network 31. The vehicle communication system 36 receives the vehicle trajectory commands 23 from the vehicle coordination assembly 33 and task assignments 21 from a task assignment allocator 55. The vehicle processor 40 monitors output signals from the sensors 38, position tracker 32 and HMI 28 and generates vehicle state messages 21 which the vehicle communications system 36 transmits to the vehicle coordination assembly 33 via the data network 31.

Figure 6:
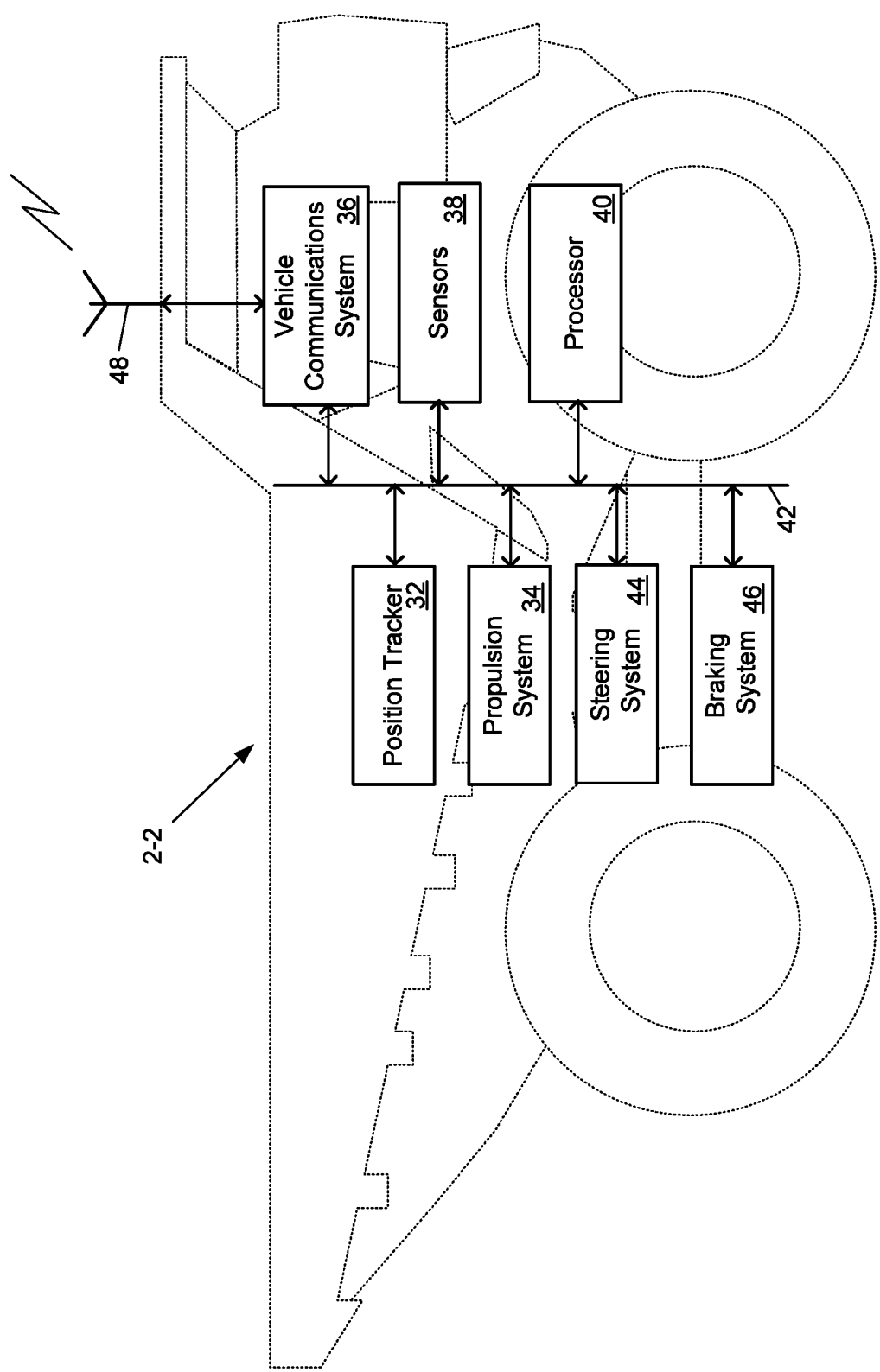
FIG. 6 is a block diagram of a driverless vehicle of the system.

FIG. 6 depicts an embodiment of a driverless truck 2-2 in which the HMI 28 and navigation and task assist module 30 of FIG. 5 is not required and in which the propulsion system 34, braking system 46 and steering system 44 are operated by the processor 40 taking into account outputs from the position tracker 32, sensors 38, road network map data either held locally in memory accessible to processor 40 or accessible from a remote source across network 31 and the task assignments 25 and trajectory commands 23 received across the network with antenna 48 and vehicle communications system 36.

As previously discussed, one objective in mining is to maximize material extraction rates. In order to do that ore is efficiently hauled from extraction areas to other parts of the network in minimal time. To achieve that goal the operation of the haul trucks is centrally coordinated by the vehicle coordination assembly 33 as shown in FIG. 4. Typically, the vehicle coordination assembly 33 receives positional information for each of the haul trucks in the form of vehicle state messages 21 via the data network 31.

The task assignment allocator 55 may include a number of workstations which are manned by human operators and which present information about the status at each of the various material processing sites (e.g. sites 7, 9, 11, 13, 15, 17) in the road network 1. It will be understood that the task assignment allocator 55 is illustrated as assuming a centralized location in FIG. 4 but it may be distributed over a number of different places in other embodiments. Based on the ever-changing status of the processing stations, and on the locations and status of each of the vehicles 2-1, . . . , 2-I, the human operators allocate task assignments 25 to each vehicle. For example, the task assignments 25 will typically include information such as a series of destinations and tasks to be performed at each destination. Typically, each task has an associated number of "trigger points" which are actions that must be performed during performance of the task assignment. The task assignment allocator 55 monitors the progress of each vehicle 2-1, . . . , 2-I, in relation to its current task assignment by receiving data communications from the vehicles via the data network 31 as each trigger point is completed.

It should be appreciated that the vehicles, namely haul trucks in the presently described embodiments, are very large. Often the haul trucks are as high as a two story building and they are operated with the aim of completing assignments in minimal time, usually travelling at maximum safe speed. Accordingly, particularly when laden, the haul trucks have very large mass and associated momentum so that active interactions, e.g. collisions, between them are highly undesirable.

In practice, task assignments are typically allocated by the task assignment allocator 55 without taking into account how the actions of each truck will affect other trucks beyond what is required to ensure safety locally. The task assignments do not include vehicle trajectory information such as acceleration commands, or other control inputs, for each vehicle for each step along a path to complete its task assignment. As will be explained, the vehicle coordination assembly is configured to generate such vehicle trajectory commands.

2 Vehicle Coordination Assembly and Methods

In general, a major part of prior art planning of vehicle trajectories assumes that a driver or machine controller of each vehicle will make local decisions in response to interactions arising with other vehicles. However, as previously mentioned, interdependencies between vehicles mean that these decisions can have complex flow-on effects on multiple other vehicles. To resolve an interaction between two vehicles, their relative travel order through a shared area must be selected. Doing this for multiple vehicles with multiple interactions amounts to a challenging combinatorial problem. In addition to the vehicle travel order, feasible and efficient trajectories must be designed around the interaction.

In an embodiment vehicle coordination assembly 33 implements a method that coordinates the movement of vehicles 2-1, . . . , 2-I and which avoids active interactions, e.g. collisions and simultaneously shares road segments within a given road network. Although it is possible to encode several different objectives in the modelling that is discussed herein, the objective of the preferred embodiment is to minimize the aggregated arrival times of all vehicles at their destinations.

To this end the preferred embodiment uses an optimization model in the form of a Mixed-Integer Linear Program (MILP) model. Due to the presence of collision avoidance constraints, the model also entails binary variables. Consequently, even for relatively confined road networks, such as those found at mine sites, the application of such a global model is challenging due to undesirable computation times, which is illustrated in the experimental section.

Three embodiments will be described that reduce computation times for the vehicle coordination assembly 33 to process the task assignments 25 and vehicle state reports 21 and generate the vehicle trajectory commands 23 whilst optimizing the objective. The first two approaches modify the optimization model, guided by solutions from a fast heuristic that computes potentially sub-optimal plans.

The first exploits multiple vehicles being constrained by their relative order while simultaneously travelling on shared roads. The resolution of discrete decision making is reduced during phases when fine grained decision making is unnecessary without needing to switch to a simpler motion model that requires more conservative and costly plans.

The second method pre-constrains the travel order of vehicles based on the solution of a faster solver. This is similar to hierarchical methods that first create an approximate solution that makes high level decisions, such as a vehicle travel order, and a second stage that creates dynamically feasible trajectories. However these can sometimes result in infeasible plans due to the first stage ignoring vehicle dynamics. This is something avoided here as the first solver uses the same vehicle dynamics as the second stage.

The third method is an iterative process that finds the optimal solution to an optimisation model by adding collision avoidance constraints in a "lazy" way and utilises routines that quickly rectify collisions in a given plan. An approach is used that accounts for more complex vehicle interactions, particularly when multiple vehicles share road segments simultaneously, and which pre-empts future iterations' additional constraints, leading to fewer iterations and less computation time overall.

Simulated experiments test the computational performance of the presented methods on test cases based on real scenarios in surface mining. Solution quality is also tested and compared to trajectories that imitate the behaviour of real trucks. Tests are based on a real surface mining operation's road network and haul truck tasks.

Figure 7:
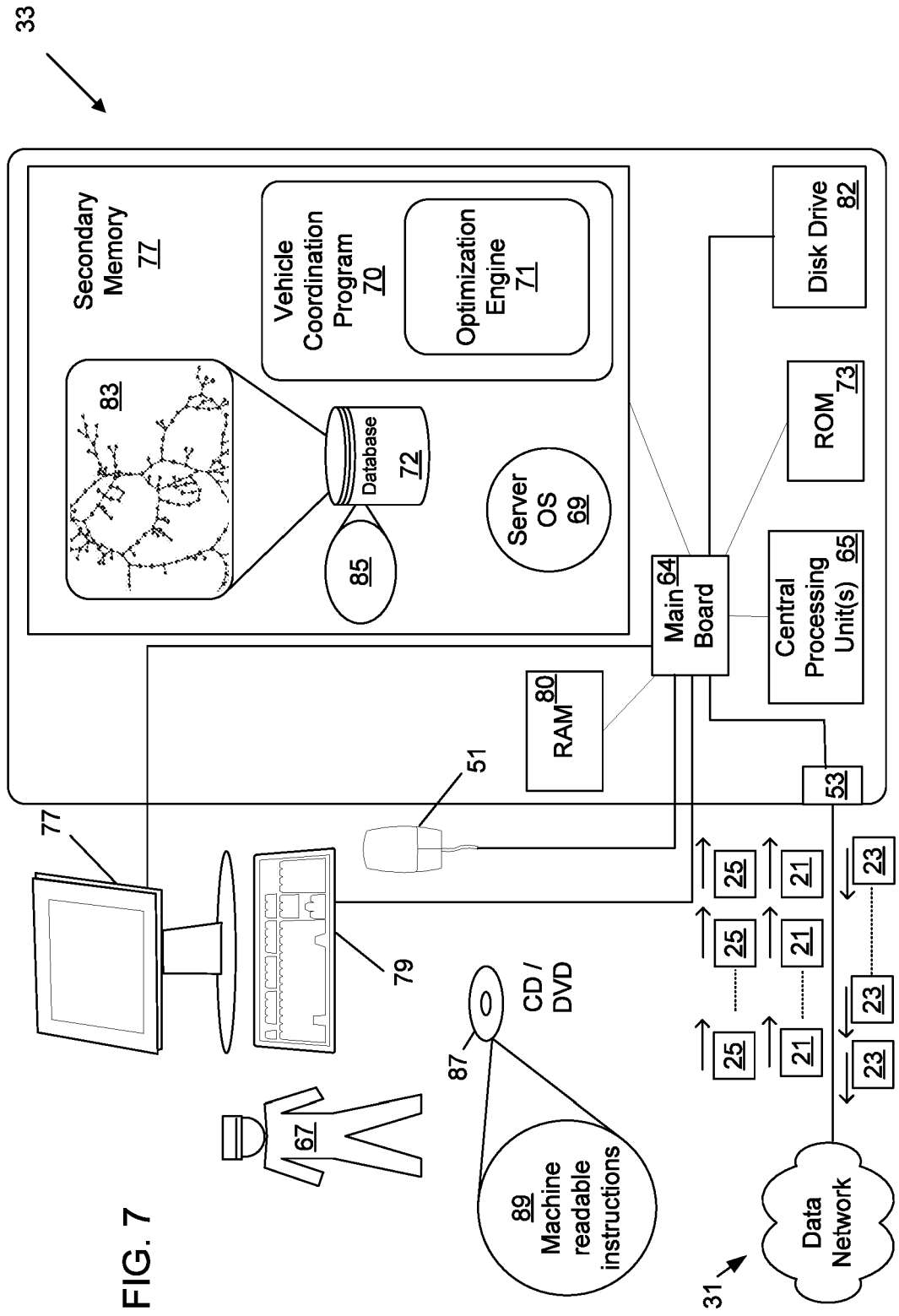
FIG. 7 is a block diagram of a vehicle coordination assembly in the form of an electronic processing system such as a computer server and software combination configured for performing a method according to an embodiment of the present disclosure.

Referring now to FIG. 7, according to a preferred embodiment of the present invention the vehicle coordination assembly is provided in the form of a specially programmed computational device being a vehicle coordination server 33 that is in data communication with each of the haul trucks 2-1, ..., 2-I via data network 31.

Whilst vehicle coordination server 33 is a preferred implementation of the vehicle coordination assembly in other embodiments a vehicle coordination assembly may be implemented as a distributed or decentralized assembly. For example, in one such alternative embodiment suitably configured one or more processors of each vehicle may transmit alternate trajectories to other vehicles that it encounters. The onboard processors of the vehicles, implementing the vehicle coordination assembly in a distributed form then negotiate pair-wise solutions using a market- or auction-based approach to decide which vehicle should proceed first through a potentially shared space. Alternatively, in other embodiments the vehicle coordination assembly may be implemented as a number of coordination servers that each act part of the fleet of vehicles, or part of the geographic layout of the road network.

As will be discussed, vehicle coordination server 33 accesses a directed graph $\mathcal{G} = (\mathcal{N}, \varepsilon)$ 83 that is stored in database 72. The directed graph 83 includes nodes representing sinks, sources, and intersections that correspond to the mine environment road network 1.

The server 33 receives time separated vehicle state messages 21 from each vehicle 2-1, ..., 2-I for each of times 1, ..., n, or upon request from the server 33, via the data network 31. Each vehicle state message 21 includes the vehicle's position, velocity, acceleration and orientation. The vehicle state messages may also include other information generated by the vehicle sensors 38 such as the weight of the material that the vehicle is hauling, condition of the brakes and proximity to obstacles.

The server 33 also receives task assignments 25 for each vehicle 2-1, ..., 2-I from a task assignment allocator 55. Each task assignment 25 defines start location and a goal location, i.e. a destination, for the vehicle. For example, a task assignment 25 may require that a particular vehicle proceeds from its current location to a specified destination such as a site in the road network 1 to be loaded with ore to be hauled. Task assignment allocator 55 then issues a subsequent task assignment 25 to require that once loaded the vehicle should travel across the road network to a processing site.

Vehicle coordination server 33 is configured by instructions of a vehicle coordination program 70 that it executes to implement a method for processing the vehicle state messages 21 and the task assignments 25 to generate paths, i.e. lists of edges and nodes, through the road network for each vehicle to complete its assigned task. Once server 33 has assigned paths to each vehicle in respect of its current task it then operates to determine vehicle trajectory commands, for example acceleration values, for each vehicle at each of a number of times or "steps" along the path in order to ensure safe, i.e. non-active interactions with other vehicles through intersections and shared paths whilst minimizing an objective function such as the total time for all vehicles to complete their tasks.

As will be discussed in more detail, the server 33 as configured by a program of instructions 70 that will be described issues vehicle trajectory commands 23 for each vehicle 2-1, ..., 2-I at each of a number of steps along the path of each vehicle for its current task assignment 25. In the presently described embodiment, the trajectory commands comprise acceleration parameters which the vehicles receive via the data network 31 and which they respond to by braking or increasing the acceleration of the vehicle as it travels along the path corresponding to its current assignment.

Server 33 includes a main board 64 which includes circuitry for powering and interfacing to one or more onboard microprocessors or "CPUs" 65.

The main board 64 acts as an interface between CPUs 65 and secondary memory 77. The secondary memory 77 may comprise one or more optical or magnetic, or solid state, drives. The secondary memory 77 stores instructions for an operating system 69. The main board 64 also communicates with random access memory (RAM) 80 and read only memory (ROM) 73. The ROM 73 typically stores instructions for a startup routine, such as a Basic Input Output System (BIOS) or UEFI which the CPUs 65 access upon start up and which preps the CPUs 65 for loading of the operating system 69.

The main board 64 also includes an integrated graphics adapter for driving display 77. The main board 64 accesses communications adapter 53, for example a LAN adaptor or a modem, that places the server 33 in data communication with data network 31.

An operator 67 of server 33 interfaces with it by means of keyboard 79, mouse 51 and display 77.

Subsequent to the BIOS or UEFI booting up the server the operator 67 may operate the operating system 69 to load the vehicle coordination program 70. The vehicle coordination program 70 may be provided as tangible, non-transitory, machine-readable instructions 89 borne upon a computer readable media such as optical disk 87 for reading by disk drive 82. Alternatively, it might also be downloaded via port 53.

As mentioned, the secondary memory 77, is typically implemented by a magnetic or solid-state data drive and stores the operating system 69, for example Microsoft Windows Server, and Linux Ubuntu Server are two examples of such an operating system.

The secondary storage 77 also includes the vehicle coordination program 70, being a server-side vehicle coordination program 70 according to a preferred embodiment of the present invention. The vehicle coordination program 70 implements a data source in the form of database 72 that is also stored in the secondary storage 77, or at another location accessible to the server 33. The database 72 stores the directed graph 83 that is used, in conjunction with the vehicle state messages 21 and task assignments 25, by CPUs 65 as configured by the vehicle coordination program 70 to implement a method for determining vehicle trajectories for each vehicle in respect of its currently assigned task across the road network 1. The database 72 stores the road network graph 83 including data defining edges interconnected by nodes and associated information such as the geographical length of each edge. Vehicle coordination program 70 implements an optimization engine 71 such as Gurobi Optimizer provided by Gurobi Optimization, LLC of 9450 SW Gemini Dr. #90729, Beaverton, Oregon, 97008-7105, USA; website: www.gurobi.com.

During operation of the server 33 the one or more CPUs 35 load the operating system 69 and then load the vehicle coordination program 70.

In use the server 33 is operated by the administrator 67 who is able to log into the server interface either directly using mouse 51, keyboard, 79 and display 77 as previously mentioned, or more usually remotely across network 31. Administrator 67 is able to monitor activity logs and perform various housekeeping functions from time to time in order to keep the server 33 operating in an optimal fashion.

It will be realized that server 33 is simply one example of an environment for executing program 70. Other suitable environments are also possible, for example the program 70 could be executed on a virtual machine in a cloud computing environment.

Methods that are implemented by the server 33 under control of the vehicle coordination program 70 in order to process the vehicle state messages and the task assignments to generate the trajectory commands will be described in the following sections of this specification. These methods are coded as machine readable instructions which comprise the vehicle coordination program 70.

In the following, Section 3 provides an overview; Section 4 formulates the MILP model; Section 5 presents modifications of the MILP to reduce the search space; Section 6 presents an iterative MILP method that reduces computation time and presents an example of operation of the server 33; Section 7 presents the results of simulated experiments; and Section 8 provides concluding remarks.

3 Overview

As previously mentioned, all vehicles 2-1, ..., 2-I travel along roads of a connected road network 1 modelled as a directed graph 83 $\mathcal{G}=(\mathcal{N},\varepsilon)$, with nodes representing sinks, sources, and intersections. Each vehicle 2-1, ..., 2-I is allocated a task assignment that defines start and goal locations in $\mathcal{G}$. Task assignments are allocated by task assignment allocation centre 55. In the following, vehicles are identified as one of 2-1, ..., 2-I or simply as i being elements from the index set of all vehicles $\mathfrak{I}=(1, \ldots, I)$.

Server 33 as configured by vehicle configuration program 70 calculates shortest paths with a graph search method such as that of Dijkstra. Each vehicle's path $\mathcal{P}$ is stored in table 85 of database 72 and consists of a sequence of connected nodes $\mathcal{P}=\{n|n\in\mathcal{N}\}$, of graph 83 $\mathcal{G}=(\mathcal{N},\varepsilon)$, which also determines a sequence of edges for the vehicle i to travel. Each road segment represented by an edge in graph 83 has an associated length which is stored in database 72. The length of a path is the sum of its edge lengths. The longitudinal position $s_i$ of vehicle i is measured along its given path. Lateral deviations are assumed negligible and not modelled. To reach its destination, vehicle i must travel a distance of $S_i^f$.

Once vehicle coordination assembly 33 has calculated paths for all vehicles, it then calculates their trajectories according to the methods that are subsequently described herein. Program 70 includes instructions for the server 33 to implement a double integrator model for vehicle dynamics. Vehicle i's position trajectory maps each point in time to a position: $s_i(t)$. Similarly, velocity and acceleration are $v_i(t)=\dot{s}_i(t)$, and $u_i(t)=\ddot{s}_i(t)$ respectively. Travel begins at time 0, and i reaches its destination at time $\mathcal{T}_i$, such that $s_i(0)=0$ and $s_i(\mathcal{T}_i)=S_i^f$.

The objective is to minimise the aggregated traversal time of all vehicles $\sum_{i\in\mathfrak{I}}\mathcal{T}_i$. For this reason velocity is assumed to be positive $v_i(t)\in[0,\overline{v}_i]$. Each vehicle's initial velocity $v_i(0)=v_{i0}$ is defined by its task assignment. Final velocities are assumed to be zero for all tasks $v(\mathcal{T}_i)=0$. This means a problem instance can begin in the middle of a vehicle's traversal, but trajectories will be planned to the end of their destination, which typically requires stopping. Control input is acceleration, $u_i(t)\in[\underline{u}_i,\overline{u}_i]$.

3.1 Interactions

If a pair of vehicle trajectories overlap in time while crossing a shared area, this would result in a collision which must be avoided. This type of interaction is labelled "active", and without overlap in time it is labelled "inactive". To ensure safety, the server 33 is programmed to only issue trajectory commands to the vehicles that result in inactive interactions so that the trajectory commands do not result in active interactions.

Figure 8:
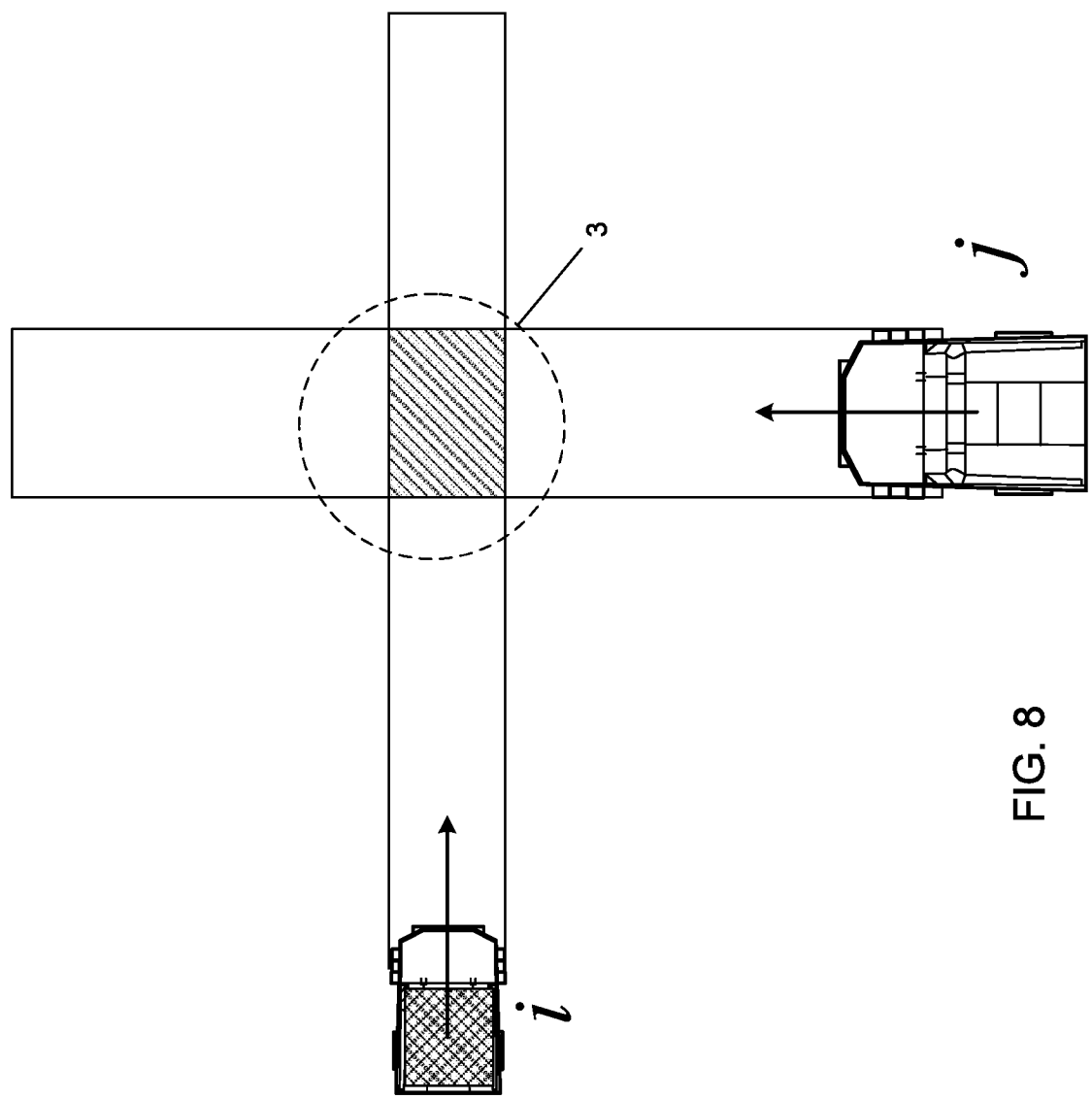
FIG. 8 depicts two vehicles prior to each crossing an intersection.
Figure 9:
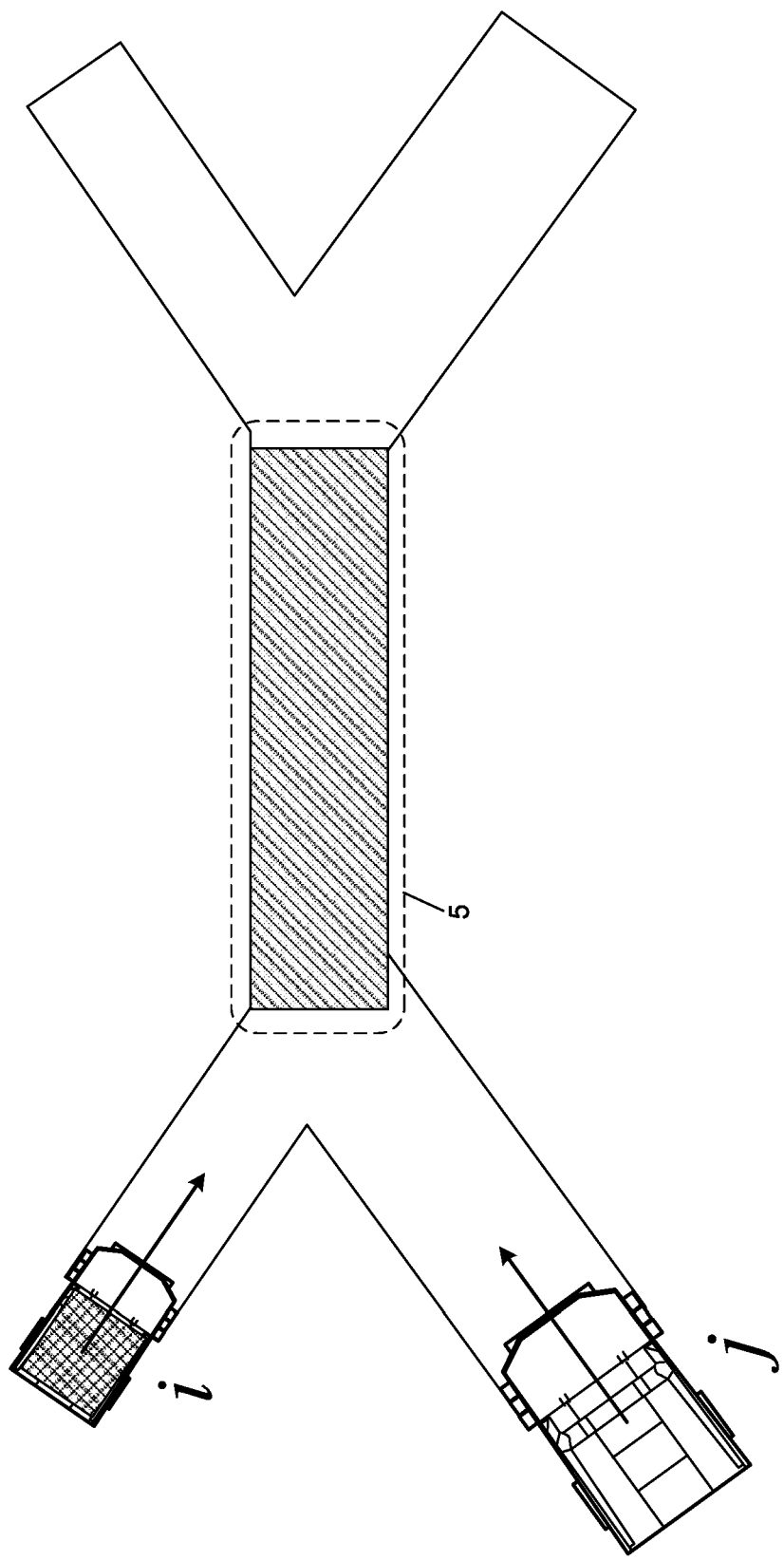
FIG. 9 depicts two vehicles prior to each crossing a shared road segment or sub-path.

Two types of shared areas are possible between a pair of paths. The first is when they cross at an intersection, as shown in FIG. 8. In graph $\mathcal{G}$, the interaction occurs at a node, e.g., node 3 of FIG. 4 which is reproduced in FIG. 8. The second type of interaction is a sub-path interaction. FIG. 9 shows a sub-path, namely sub-path 5 of FIG. 4. A sub-path occurs when the paths of two vehicles share at least one common edge of graph $\mathcal{G}$ 83. The shared area of a sub-path is represented by a sequence of one or more connected edges in $\mathcal{G}$. It should be noted that overtaking manoeuvres are not considered here.

Figure 10:
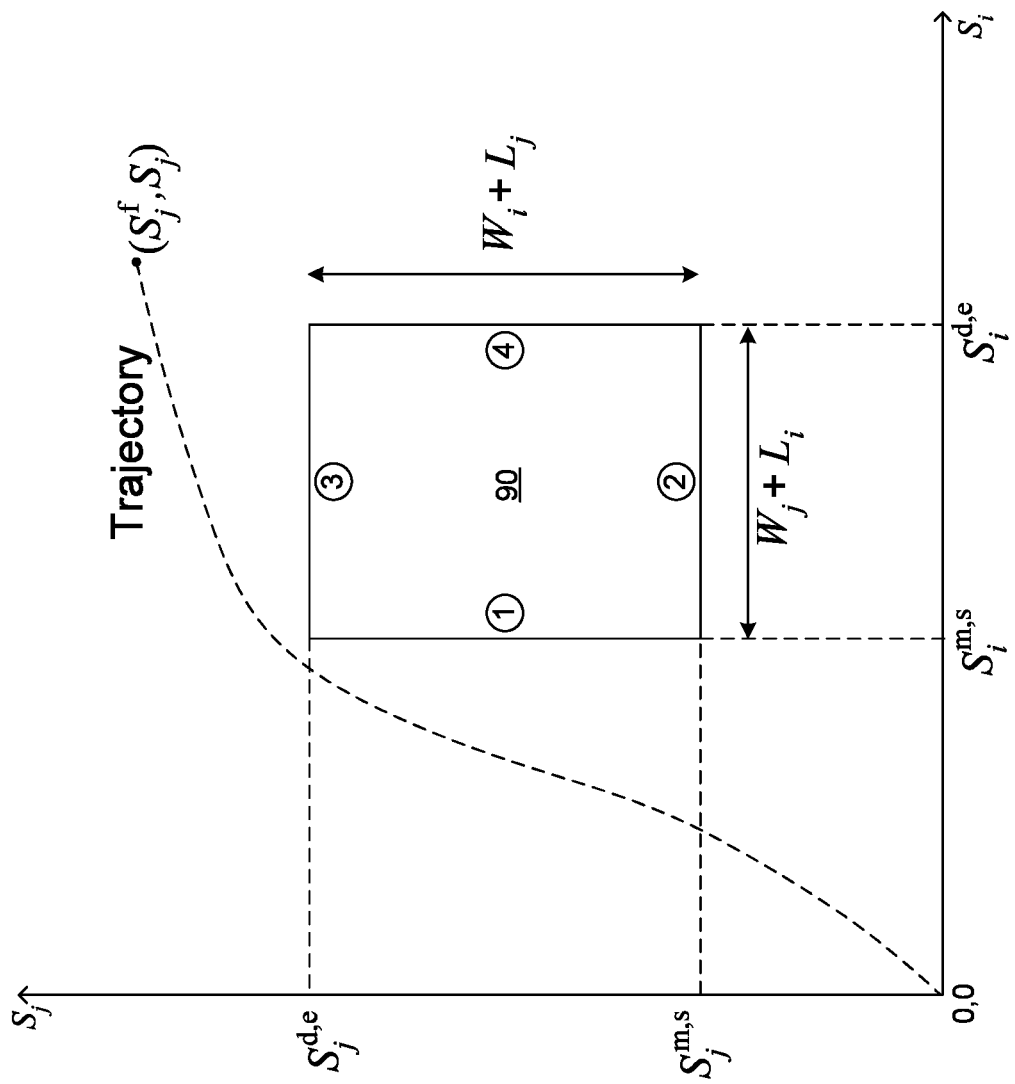
FIG. 10 is a graph corresponding to FIG. 8 showing a joint trajectory of the two vehicles in coordination space with respect to the intersection.
Figure 11:
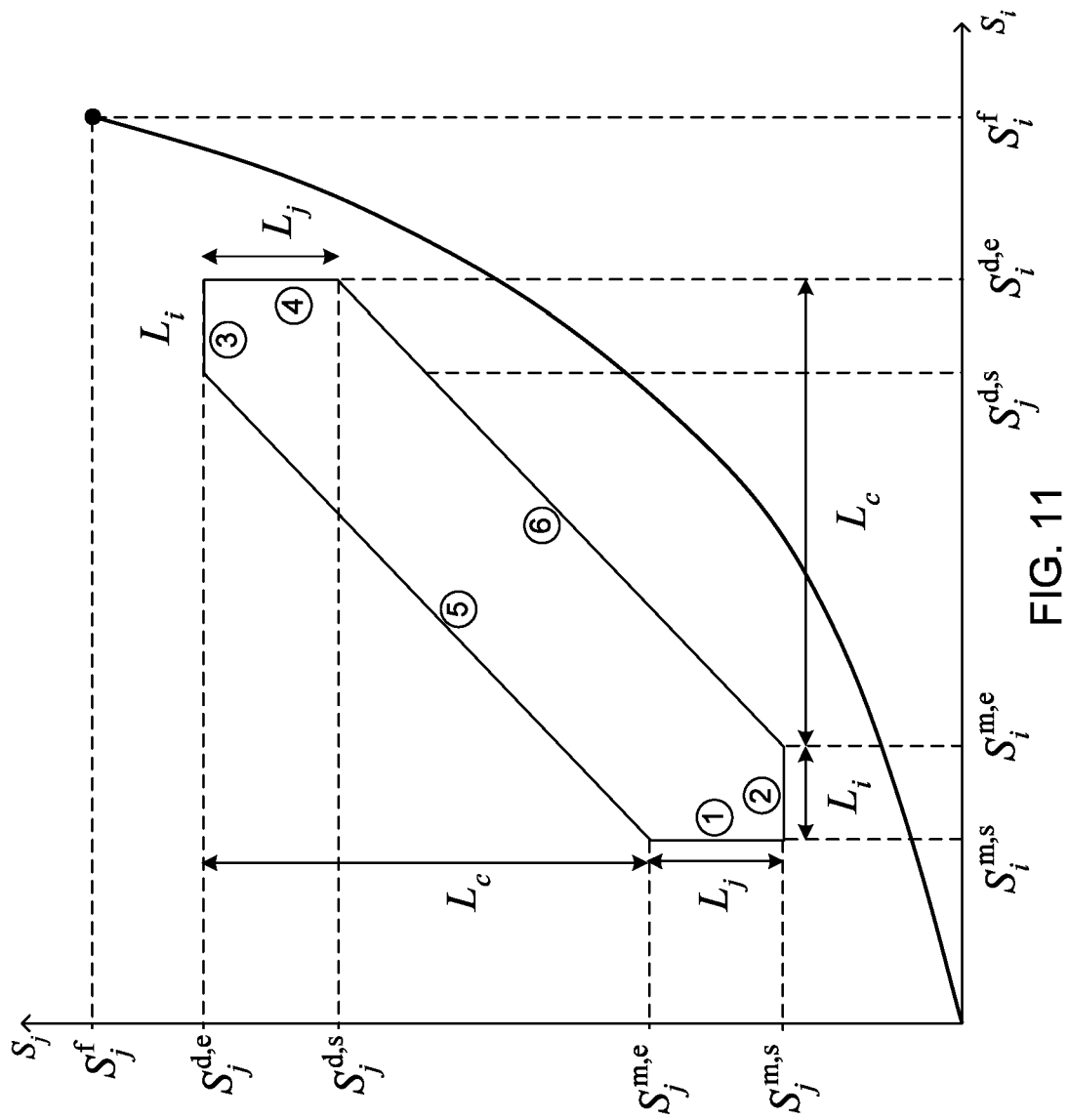
FIG. 11 is a graph corresponding to FIG. 9 showing a joint trajectory of the two vehicles in coordination space with respect to the sub-path.

Intersection and sub-path interactions can be modelled in coordination space, as visualised in the graphs of FIGS. 10 and 11 respectively in which each axis corresponds to one vehicle, and its values represent the vehicle's position along the path. The coordination space of two vehicles is a 2D space, and a point in this space represents the joint position of the two vehicles along their paths: $(s_i,s_j)$. FIG. 10 shows an example of a joint position trajectory of both vehicles, visualised as a curve in coordination space parameterised by time.

If two vehicles interact and have paths that share an area, the set of joint positions where the vehicles physically overlap is called a conflict set, which acts as an obstacle in coordination space. To avoid collisions, the joint trajectories must avoid passing through these obstacles. FIG. 10 shows the coordination space of two vehicles with an intersection interaction. The obstacle is the rectangle 90 with each side length equal to the sum of the length ($\mathcal{L}_i$) and width ($\mathcal{W}_i$) of the corresponding vehicle (i), including any safety buffer. Similarly, FIG. 11 shows a sub-path interaction as a six-sided polygon obstacle.

Figure 12:
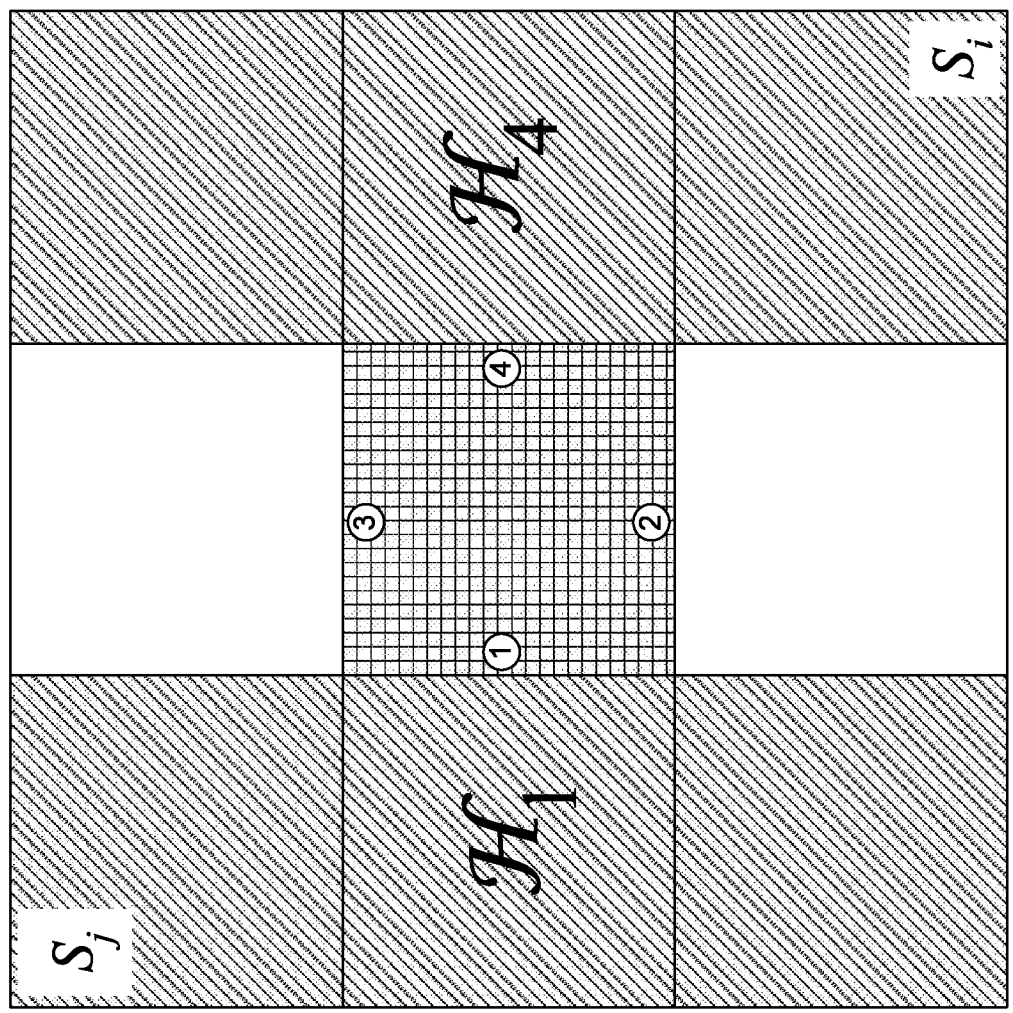
FIG. 12 depicts coordination space for an intersection interaction wherein the space is partitioned into half-spaces H.
Figure 13:
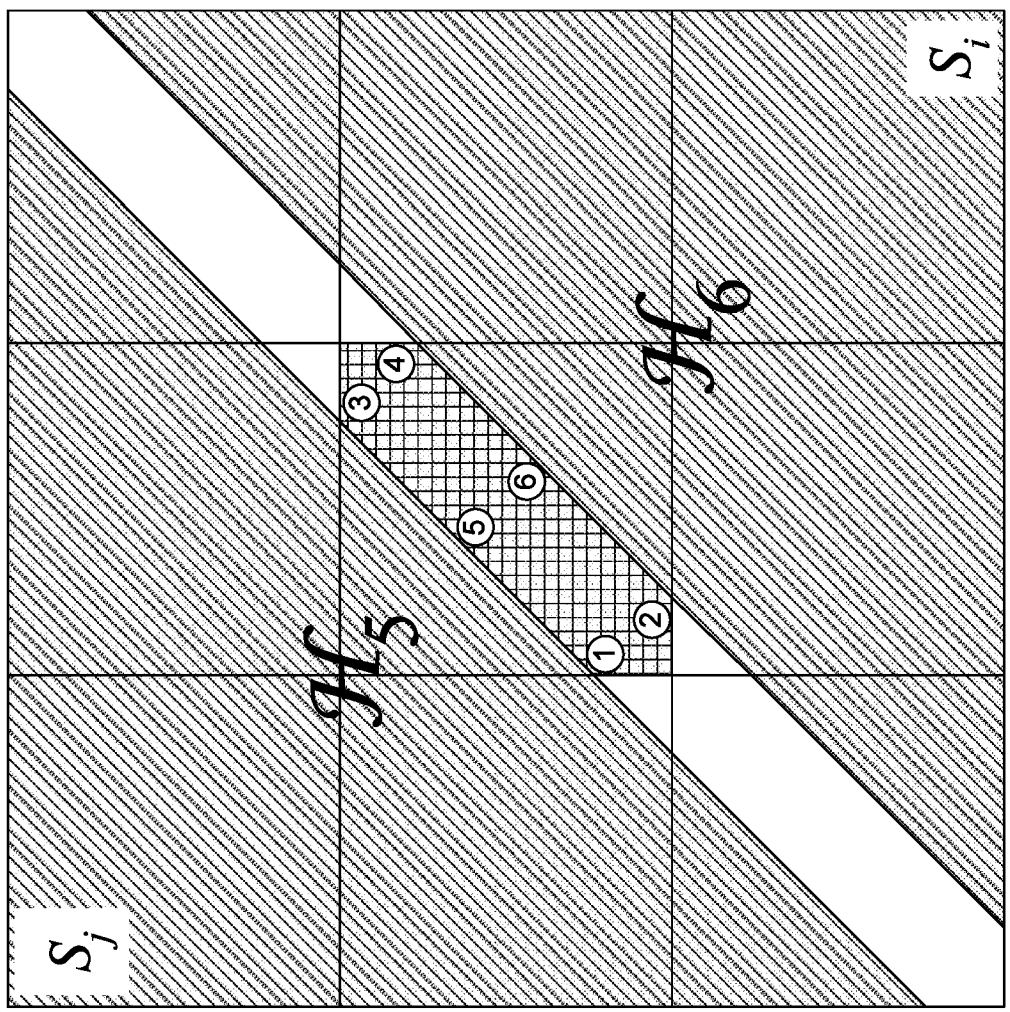
FIG. 13 depicts coordination space for a sub-path interaction wherein the space is partitioned into half-spaces H. Half-spaces $H_1$ and $H_4$ are indicated.

Key locations along vehicle i's path are marked in FIGS. 10 and 11 ($S_i^{m,e}$ and $S_i^{d,s}$ only apply to sub-path interactions):

$S_i^{m,s}$: Vehicle i starts merging into the sub-path
$S_i^{m,e}$: Merged entirely inside
$S_i^{d,s}$: Starts diverging from the sub-path
$S_i^{d,e}$: Diverged entirely
$S_i^{f}$: Goal location The coordination space of a pair of interacting vehicles i,j can be partitioned by lines defined by the edges of the conflict set polygon. Edge e's line segment is extended to create line $a_e^T s = b_e$, where $s=(s_i,s_j)$ and vector $a_e$ is normal to the line. Each line bounds a half-space $\mathcal{H}_e = \{s | a_e^T s \leq b_e\}$. Vector $a_e$ is in the direction towards the conflict set, and halfspace $\mathcal{H}_e$ covers the area away from the conflict. For example, FIG. 12 highlights half-spaces $\mathcal{H}_1$ and $\mathcal{H}_4$ for an intersection conflict, and FIG. 13 highlights $\mathcal{H}_5$ and $\mathcal{H}_6$ for a sub-path. Table 1 lists the values of $a_e$ and $b_e$ for each half-space. Intersection and sub-path interactions have four and six half-spaces respectively. The half-spaces make up the feasible, conflict-free region of coordination space. To avoid collisions, trajectories must remain in the half-spaces. The feasible region is non-convex due to the presence of the conflict set, which will require the introduction of binary variables in the MILP model presented in Section 4.

TABLE 1

List of indices corresponding to the conflict polygon edge. Associated with each edge e is a half-space $\mathcal{H}_e$. See FIG. 4 for edge and half-space labels.

| Edge e | Half-space | $a_e$ | $b_e$ |
| --- | --- | --- | --- |
| 1 | $\mathcal{H}_1$ | $[1, 0]^T$ | $S_i^{m,s}$ |
| 2 | $\mathcal{H}_2$ | $[0, 1]^T$ | $S_j^{m,s}$ |
| 3 | $\mathcal{H}_3$ | $[0, 1]^T$ | $S_j^{d,e}$ |
| 4 | $\mathcal{H}_4$ | $[1, 0]^T$ | $S_i^{d,e}$ |
| 5 | $\mathcal{H}_5$ | $[-1, 1]^T$ | $S_j^{m,e} - S_i^{m,s}$ |
| 6 | $\mathcal{H}_6$ | $[1, -1]^T$ | $S_i^{m,s} - S_j^{m,e}$ |

Once a set of paths is known, the set of all resulting interactions C identified, which contains vehicle pairs $c=(i,j)$ that have shared areas along crossing paths. This set is composed of intersection and sub-path interactions: $C = C^{int} \cup C^{path}$. If trajectories are available for all vehicles, they can be used to classify each interaction as either active or inactive, and the set of all interactions can be divided into two sets as $C = C^{active} \cup C^{inactive}$.

Real vehicle interactions may have conflict sets with shapes more complex than the polygons presented here, similar to those presented by Altché et al. (2016). The conflict sets shown in FIGS. 10 and 11 are based on vehicles approximated with bounding rectangles. However, the framework presented here could also use convex polygons that more closely approximate the actual conflict set, by defining a half-space for each edge of the polygon.

Intersection interactions assume vehicles cross perfectly straight at right angles. Deviations from ideal motion can be compensated by more detailed modelling of path geometry, or by adding a safety buffer around obstacles, which also helps avoid relying on perfect motion models, control, and sensing. Similarly ideal motion is assumed for sub-paths.

4 Mixed Integer Linear Program

This section explains the mixed integer linear programming (MILP) problem that server 33 under control of program 70 solves and which is based on a mathematical model that approximates the multi-vehicle system. It includes constraints that describe vehicle dynamics, collision avoidance, and goal constraints. Optimising the MILP problem yields feasible trajectories that minimise vehicle traversal times. The MILP problem is solved by the vehicle coordination assembly 33 as configured by the instructions comprising program 70 including instructions that implement the optimization engine 71. The solution of the MILP problem results in data required for the vehicle coordination assembly, implemented in the present embodiment as server 33, to generate the trajectory commands 23 that it issues to the vehicles via network 31.

When similar multi-vehicle models are constructed for 2D and 3D environments, vehicle-pair interactions are possible across the entire workspace. Consequently, they account for collisions for every vehicle-pair. In contrast, the scenarios encompassed by the presently described embodiments involve vehicles travelling on a road network environment, and their motion is modelled along one dimension. This means interactions only need to be modelled between vehicle-pairs with crossing paths, and only within shared zones. This results in smaller models that can be solved faster.

To implement a MILP, a discrete-time model is used, with $$K = \frac{T}{\Delta t}$$

number of steps, where $\Delta t$ is the time step duration, and T is selected as a high estimate of the last vehicle's destination time. The end of step k corresponds to time $t_k = k\Delta t$. Vehicle i's position and velocity at the end of step k are $s_{i,k} = s_i(t_k)$ and $v_{i,k} = v_i(t_k)$. Control input $u_k$ is assumed constant throughout the duration of each step: $[t_k, t_{k+1}]$. The model is as follows:

Minimise $$J = \min_{s_{i,k}} \sum_{i=1}^{I} \sum_{k=\underline{K_i}}^{\overline{K_i}} |S_i^f - s_{i,k}| \quad (1)$$

subject to dynamics constraints $$\forall i \in I, \forall k \in \{0, \ldots, K-1\} \quad (2)$$

$$\begin{bmatrix} s_{i,k+1} \\ v_{i,k+1} \end{bmatrix} = A \begin{bmatrix} s_{i,k} \\ v_{i,k} \end{bmatrix} + Bu_k$$

-continued with $$A = \begin{bmatrix} 1 & \Delta t \\ 0 & 1 \end{bmatrix}, B = \begin{bmatrix} \Delta t^2/2 \\ \Delta t \end{bmatrix}$$

$$0 \leq v_{i,k} \leq \overline{v_i}$$

$$\underline{u_i} \leq u_{i,k} \leq \overline{u_i}$$

boundary constraints $$s_{i,0}=0, s_{i,K}=S_i^f, v_{i,0}=V_{i0}, v_{i,K}=0 \quad (3)$$

and interaction avoidance constraints

Merging:

$$\forall c=(i,j) \in C,$$

$$s_{i,k} \leq S_i^{m,s} - M(1-b_{c,k,1})$$

$$s_{j,k} \leq S_j^{m,s} - M(1-b_{c,k,2}) \quad (4)$$

Diverging:

$$\forall c=(i,j) \in C,$$

$$s_{i,k} \leq S_i^{d,e} - M(1-b_{c,k,3})$$

$$s_{j,k} \leq S_j^{d,e} - b_{c,k,4}) \quad (5)$$

Following:

$$\forall c=(i,j) \in C_{path},$$

$$s_{j,k} - s_{i,k} \leq S_j^{m,e} - S_i^{m,s} - M(1-b_{c,k,5})$$

$$s_{i,k} - s_{j,k} \geq S_i^{m,e} - S_j^{m,s} - M(1-b_{c,k,6}) \quad (6)$$

Intersections:

$$\forall c \in C^{int}, \quad (7)$$

$$\sum_{e=1}^{4} b_{c,k,e} \geq 1$$

Subpaths:

$$\forall c \in C^{path}, \quad (8)$$

$$\sum_{e=1}^{6} b_{c,k,e} \geq 1$$

with $$\forall e \in \{1, \ldots, 6\}, b_{c,k,e} \in \{0,1\}$$

The MILP problem consisting of equations (1) to (8) will be referred to as model M. Constraint equations (2) describe vehicle i's velocity and position at the end of step k. Bounds are also placed on velocity and acceleration based on the physical quantities that govern the motion of the trucks (weight, rolling friction, maximum torque, etc.) and are enforced in the simulations discussed in Section 7. Since the aim is to minimise traversal time, velocity is assumed positive.

4.1 Objective Function

Several different objective functions can be used. In the paper by (Gun et al. 2019), an objective function that directly minimizes arrival time is used, but requires binary variables. In the present embodiment an objective function (1) is used, which sums the absolute distance-to-goal values of each vehicle across a range of time steps. It penalises vehicle positions away from the goal, which means the optimisation process results in trajectories that pull each vehicle towards its goal. This is an indirect way of minimising traversal time, but avoids the use of binary variables. The absolute terms are modified to make them linear as described in Kwon (2013), referenced at the end of this specification.

The distance-to-goal penalties of vehicle i in (1) are summed over time steps $\{\underline{K_i}, \ldots, \overline{K_i}\}$. $\underline{K_i}$ and $\overline{K_i}$ act as lower and upper bounds (LB/UB) on the goal arrival time of vehicle i, and are identified prior to constructing the function. The LB is based on an optimistic estimate of the vehicle's arrival time. Let $\underline{T_i}$ be vehicle i's minimal goal time while neglecting all interactions. A dynamically feasible trajectory assigned to vehicle i cannot have a goal time earlier than $\underline{T_i}$ in the multi-vehicle problem. To obtain $\underline{K_i}$, round down $$\frac{T_i}{\Delta t}$$

to the nearest time step.

The UB is based on a feasible, but generally suboptimal solution to the multi-vehicle problem, which is found using a different solver. A feasible solution provides vehicle i's goal time $t_i$, which is used to compute a delay time $d_i = t_i - \underline{T_i}$. An upper bound on i's arrival time in any optimal multi-vehicle solution is $\overline{T_i} = \underline{T_i} + \Sigma_{j \in I} d_j$. This is rounded up to obtain $\overline{K_i}$.

An alternative to using the narrow range of time steps is for program 70 to include instructions for the entire range $\{1, \ldots, K\}$. However, this can cause two problems. First, vehicle trajectories behave more greedily when they are far away from their destination because the associated penalties dominate penalties at times when the vehicles are close to their destination. This can be a problem when low velocity early on results in a better solution for the vehicle fleet. Second, vehicles may arrive at the goal location with positive velocity and overshoot. This is caused by the extra penalties—after overshooting—being similarly dominated. The narrower range results in more direct optimisation of goal time, better behaved trajectories, and zero final velocity.

4.2 Collision Avoidance

For a trajectory of two vehicles with interaction $c=(i,j)$ to avoid collision, their joint position in coordination space $(s_c=(s_i,s_j))$ must be in at least one of the half-spaces $\mathcal{H}_e$ in Table 1. Hence the aim of the collision avoidance constraints is to ensure $s_c$ is in at least one half-space along the entire trajectory. This is done by constraints (4)-(8), which are applied at all time steps and to all interactions C to ensure they are inactive. The intersection and sub-path conflict sets represented in FIGS. 10 to 14 show positions $s_c$ where vehicle pairs are in collision and must be avoided. The avoidance constraints, which force the joint trajectories to remain outside of the conflict sets, are constructed from their polygons, and their shapes determine the number of collision avoidance constraints. Intersection interactions require the four inequalities in (4) and (5), corresponding to the four edges of the rectangular conflict set. Sub-paths have six-sided conflict set polygons and require the additional two inequalities in (6).

To force the joint position s to be contained in half-space $\mathcal{H}_e$, the corresponding values of a and b in Table 1 are used to construct an inequality constraint. Half-spaces $\mathcal{H}_1$ and $\mathcal{H}_2$ correspond to the inequalities (4), $\mathcal{H}_3$ and $\mathcal{H}_4$ correspond to (5), and $\mathcal{H}_5$ and $\mathcal{H}_6$ correspond to (6). The six constraints are split into three categories, corresponding to three stages of motion in relation to the sub-path: Merging, diverging, and following. The joint position of an interacting vehicle pair cannot be located in all half-spaces of the coordination space simultaneously. For example, half-spaces $\mathcal{H}_1$ and $\mathcal{H}_4$ are disjoint, as shown in FIG. 4a. For this reason, constraints (4)-(6) use a Big M formulation. This adds another term to each inequality that includes a binary variable. The value of the binary variable determines whether its inequality constraint is enforced or relaxed.

For each sub-path interaction c six binary variables are defined $\{b_{c,k,e}|\forall e\in 1\ldots 6\}$, with each one corresponding to an inequality in (4)-(6). Index e in $b_{c,k,e}$ identifies the obstacle polygon's edges. When $b_{c,k,e}=1$, its corresponding constraint is enforced, while $b_{c,k,e}=0$ means the constraint is relaxed. For example, when $b_{c,k,1}=1$, joint position $s_{c,k}=(s_{i,k}, s_{j,k})$ is in $\mathcal{H}_1$. When $b_{c,k,1}=0$, the constraint is trivially satisfied and effectively relaxed. In this case, $s_k$ is not constrained to be within $\mathcal{H}_1$. However, it may still feasibly be inside $\mathcal{H}_1$.

For the joint position $s_{c,k}$ to be located outside of the sub-path conflict set at time step k, at least one of the constraints in (4)-(6) must be enforced. Summing constraint (8) achieves this by forcing at least one of $b_{c,k,e}|\forall e\in \{1, \ldots, 6\}$ to equal 1, ensuring that both vehicles are out of the sub-path, or that they are not physically overlapping while simultaneously inside. This constraint is applied for all time steps k to make the interaction inactive. Similarly, constraint (7) ensures that one of constraints in (4)-(5) is enforced for intersection interactions.

Setting $b_{c,k,e}=1$ means joint position $s_{c,k}$ is located in half-space $\mathcal{H}_e$ at time step k. Setting $b_{c,k,e}=1$ for multiple edges e narrows down $s_{c,k}$ to an intersection of corresponding half-spaces at step k. The collective values of $b_{c,k,e}$ across all time steps determine which half-spaces the joint trajectory curve passes through, and which side of the conflict set it sits. This corresponds to the travel order of i and j through the shared area, and when they bypass each other. For example, the curve in FIG. 11 means vehicle i crosses the sub-path ahead of j. During the optimisation of MILP model M, all possible travel orders are considered. In contrast, travel order is determined in decoupled planners by the priorities pre-assigned to vehicles (Erdmann and Lozano-Perez 1987).

5 MILP Complexity Reduction

Although the direct use of monolithic MILP model M (Section 4) works for small sized problems, it is hampered by excessive computation time as the problem scales up, as will be shown in Section 7. It is used as a baseline upon which modifications are made to reduce computation time and make it appropriate for practical applications. The largest effect on the computation time is from the presence of binary variables $b_{c,k,e}$ in the collision avoidance constraints. Reducing them is the focus of this section, as well as Section 6.

Two modifications to M are described that apply additional constraints: The first exploits the structure of vehicle interactions on road networks to create more efficient models. The second constrains vehicles to use predetermined vehicle travel orders. Both are similar to hierarchical planners, in the sense that they use an initial solver to plan vehicle trajectories, which guide the MILP. For the experiments in Section 7, the Sequential Avoidance Heuristic by Gun et al. (2019) was used to produce these trajectories, which is suboptimal in general. The heuristic selects the travel orders greedily on a first come first serve basis, and finds solutions faster than optimising model M.

5.1 Binary Variable Resolution Reduction

To construct model M, a time step duration $\Delta t$ must first be selected. The shorter $\Delta t$ is, the higher the resolution of the vehicle trajectories. A high resolution can be beneficial for achieving smoother and more realistic motion that vehicle coordination assembly 33 can track closely in real time. However, the solution process also requires making a discrete decision at each time step for each interaction. Namely, in which half-spaces of coordination space is the joint state located. The Inventors hypothesized that large computation time savings can be achieved by vehicle coordination assembly 33—with minor increases in solution costs—by including instructions in program 70 for selecting which half-space of coordination space vehicles are located in, at a lower frequency than $1/\Delta t$.

Model M can be modified by decreasing the resolution of binary variables $b_{c,k,e}$ while keeping the resolution of the continuous state variables $s_{i,k}$, $v_{i,k}$ unchanged. Variables $b_{c,k,e}$ at different steps k are selected independently of each other in M. However, a group of these variables adjacent in time can have their values equalised. For example, take interaction $c=(i,j)$, and a group of adjacent time steps bundled into $\alpha=\{\underline{k}, \ldots, \overline{k}\}|0\leq\underline{k}, \overline{k}\leq K$. The binary variables corresponding to those steps can be tied together by adding the following constraints to M:

$$\forall k\in\alpha, e\in\{1,\ldots,6\}$$

$$b_{c,k,e}=b_{c,k+1,e} \qquad (9)$$

This keeps the joint position of vehicles i and j in the same half-spaces of coordination space between time $\underline{k}\Delta t$ and $\overline{k}\Delta t$. This grouping can be applied across the entire time range. Let [0, T] be split up into A intervals such that interval $\alpha$ is $\tau_\alpha=[\underline{t}_\alpha, \overline{t}_\alpha]$, with $\overline{t}_\alpha=\underline{t}_{\alpha+1}|\forall \alpha\notin\{1,\ldots,A-1\}$. A group of time steps $\alpha_\alpha=\{\underline{k}_\alpha, \ldots, \overline{k}_\alpha\}$ is constructed for each interval, creating the set $A=\{\alpha_1, \ldots, \alpha_\alpha\}$. Indices $\underline{k}_\alpha, \overline{k}_\alpha$ are defined by rounding $\underline{t}_\alpha, \overline{t}_\alpha$ to the nearest discrete time steps and adjusting the first and last steps of each group aa to avoid overlap: $\overline{k}_{\alpha+1}=\underline{k}_\alpha+1$.

If constraints (9) are applied to every group in A for c as follows, $$\forall \alpha\in A, k\in\alpha, e\in\{1,\ldots,6\}$$

$$b_{c,k,e}=b_{c,k+1,e} \qquad (10)$$

then the resolution of the discrete decision making is effectively reduced, as is the search space of the optimisation problem. If all intervals in A have equal lengths, then the lower resolution remains uniform, with the duration between independent decisions increasing from $\Delta t$ to approximately T/A depending on the discretisation parameters. The longer the time interval and larger the group size $|\alpha|$, the greater the reduction in resolution and search space. Note that collision avoidance is maintained for all time steps within each group $\alpha$, not only between their time intervals.

A disadvantage of applying constraints (10) is that the joint trajectory of two interacting vehicles cannot transition between some half-spaces at any time step. It must be done between two intervals $\tau_\alpha$ and $T_{\alpha+1}$. This could cause vehicle delays, and in general will increase the solution cost. However, consider an optimal solution and a time interval $\tau$ when the joint trajectory of interacting vehicles i, j remains within the same half-space. The values of $b_{c,k,e}$ will not change across steps corresponding to times within $\tau$: $\{k|k\Delta t \in \tau\}$. If constraints (9) are applied only within $\tau$, there would be no loss of independent decision making for the eventual solution given by the optimiser.

Rather than a uniform resolution in binary variables across time range [0, T], a higher resolution can be used around times when the joint trajectory is expected to transition between different half-spaces: Around the merging and diverging stages. Far from these stages, a lower resolution can be used without hindering the solution quality. This includes the following stage of a sub-path interaction. If vehicles i, j traverse a shared sub-path close to each other, their joint trajectory curve will be close to the obstacle in coordination space. The vehicle travel order cannot feasibly change while following, and hence neither can the values of $b_{c,k,e}$. The longer the sub-path, the longer the sequence of adjacent steps k in which the values of $b_{c,k,e}$ remain the same.

A sequence of time intervals $\{\tau_\alpha | \forall a \in 1, \ldots, A-1\}$ for an interacting vehicle pair is selected based on a feasible joint trajectory relative to their conflict set. A non-uniform resolution is implemented with short intervals around the estimated merging and diverging stages and long intervals elsewhere. The timing of the interaction stages is unknown a priori, but can be estimated from the solution of another multi-vehicle trajectory planner. In general the timing of these stages is different for each interaction c, hence a different sequence $\{\tau_\alpha\}$ is defined for each c. Set $A_c$ is then created, composed of time step groups aa corresponding to intervals $\tau_\alpha$.

Figure 14:
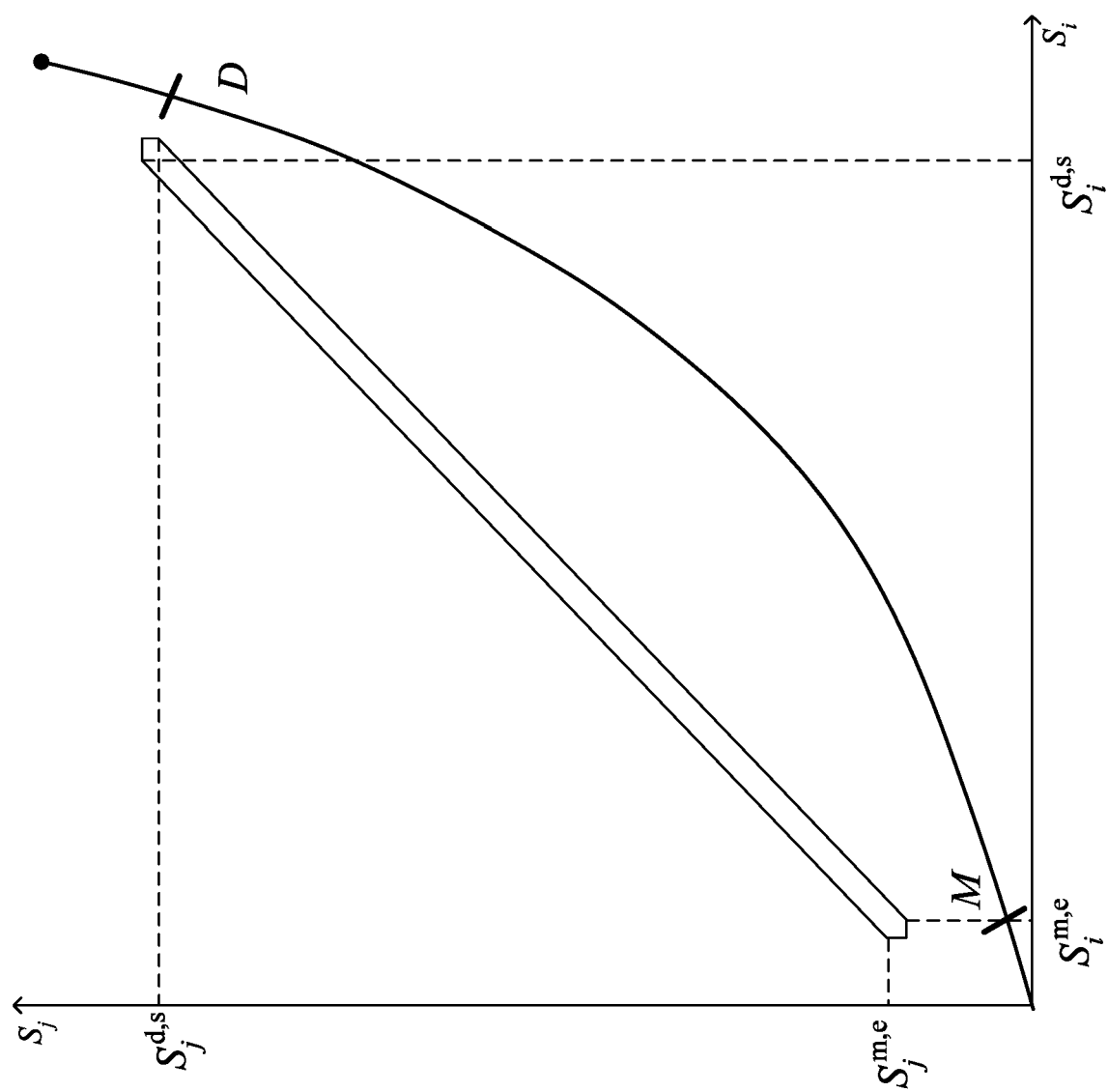
FIG. 14 Is a graph depicting coordination space of a sub-path interaction of length 600 m, and 15 m long vehicles in which $S_i^{m,e}$ indicates where vehicle i completely merges into the subpath, and $S_i^{d,s}$ where it begins to diverge. Similarly for vehicle j.

FIG. 14 shows an example of a sub-path interaction, scaled to match realistic mining scenarios. Namely, the coordination space of a sub-path interaction of length 600 m, and 15 m long vehicles. $S_i^{m,e}$ indicates where vehicle i completely merges into the sub-path, and $S_i^{d,s}$ where it begins to diverge and similarly for j.

Vehicle i is entirely physically contained in the shared sub-path region within position segment $[S_i^{m,e}, S_i^{d,s}]$. I.e. No component of i protrudes outside of the shared area if $s_i \in [S_i^{m,e}, S_i^{d,s}]$. Consider the time interval $\tau_i^{inner} = [t_{ime}, t_{ids}]$ when i crosses these positions. Similarly for j; segment $[S_j^{m,e}, S_j^{d,s}]$ and interval $\tau_j^{inner} = [t_{jme}, t_{jds}]$. The union of the two intervals, $\tau_{MD} = \tau_i^{inner} \cup \tau_j^{inner}$, results in the interval between the first vehicle entirely merging and the last vehicle beginning to diverge. The corresponding points of the joint trajectory are marked M and D in FIG. 14. The long following stage in this figure suggests that there will be few transitions between half-spaces for most of the interval $\tau_{MD}$, and is hence selected for lower resolution.

A lower resolution can also be applied to the time interval $\tau_{OM} = [0, t_{ime} - D_m]$ when i is the first vehicle to merge, where $D_m$ is some fixed length of time prior to the estimated merging time. Similarly for interval $\tau_{DT} = [t_{jds} + D_d, T]$ when j is the last vehicle to diverge and $D_d$ is a fixed time after divergence. $D_m$ and $D_d$ are user defined parameters. Each interval $\tau_{OM}, \tau_{MD}, \tau_{DT}$ is broken up into sub-intervals $\{\tau_\alpha\}$ which determine time step groups $A_c = \{\alpha_a\}$. The sub-intervals are defined so that the maximum size of each group is $\overline{|\alpha|}$, a pre-selected parameter. For example, if $\tau_{MD}$ contains 13 adjacent time steps with $\overline{|\alpha|} = 5$, three groups are created with sizes of 5, 5 and 3.

A large $\overline{|\alpha|}$ means fewer independent binary variables and lower computation time in general. It can even be selected to fill the interval $\tau_{MD}$. However, this will force the joint trajectory to remain in the same half-space during $\tau_{MD}$ and unnecessarily delay destination arrival. Intervals $\tau_{OM}, \tau_{MD}$, and $\tau_{DT}$ are based on estimated interaction times, which will not match those of the optimal trajectories in general. A smaller $\overline{|\alpha|}$ provides more flexibility to shift the trajectories around and find higher quality solutions.

This method segregates [0, T] into time intervals that are either dense or sparse in half-space selection. Outside of $\tau_{OM}, \tau_{MD}$, and $\tau_{DT}$, independent binary variables are applied at all time steps k. Although the number of the decisions available to vehicles still decreases, a sparser resolution within intervals $\tau_{OM}, \tau_{MD}$, and $\tau_{DT}$ will have a smaller loss of decisions compared to a uniformly sparse half-space selection across all of [0, T].

An alternative to uniform group sizes $\overline{|\alpha|}$ in designated dense intervals, is to vary the sizes $\overline{|\alpha_\alpha|}$ across [0, T]. This involves using small groups at the estimated merging and diverging times, gradually increasing outwards away from the interaction and within the middle following stage. This reflects the need to make fine-grained actions during the key merging and diverging stages, and the decreasing likelihood of the need for discrete decisions away from those times. Once groups A, are defined for each interaction, constraints (10) are applied to all interactions as:

$$\forall c \in C, a \in A_c, k \in \alpha, e \in \{1, \ldots, 6\}$$

$$b_{c,k,e} = b_{c,k+1,e} \quad (11)$$

The collision avoidance constraints (4)-(6) might not be applied to all steps $\{1, \ldots, K\}$. Such cases are considered in Section 6, where the interaction avoidance constraints are targeted to apply to a smaller subset of time steps. In this case, groups a may be created out of sub-groups smaller than those based on the procedure described earlier. For example, if a contiguous sequence of time steps $\{k_s, \ldots, k_f\}$ to be grouped has a break at step $k_s < k < k_f$ in terms of applied collision avoidance constraints, sequence $\{k_s, \ldots, k-1\}$ is first bundled into groups of maximum size $\overline{|\alpha|}$, and then $\{k+1, \ldots, k_f\}$ is separately bundled.

5.2 Predetermined Vehicle Order

A further reduction of the search space is possible by including instructions in program 70 to configure vehicle coordination assembly 33 to select in advance the travel orders of interacting vehicle pairs, through shared areas. This is achieved by pre-setting particular binary variables to given values, prior to optimising. The travel orders are guided by trajectories given by another solver.

This strategy breaks the problem down into two stages, with each more suited to different aspects of the planning problem. The first addresses the combinatorial component by heuristically selecting vehicle travel orders. The second stage uses the travel orders of the first, and refines the coupled trajectories by combining them in a single optimisation model. With fewer discrete decisions to make, the new model's optimisation time also reduces.

The aim of the two stage method is to reduce the overall computation time of the sum of the two stages, compared to solving both aspects of the problem simultaneously. However, pre-setting vehicle travel orders has an impact on the quality of the solutions. This trade-off is discussed in the experimental section.

To constrain the travel order of a sub-path interaction c=(i,j) in the MILP model, the values of binary variables $b_{c,k,5}$, $b_{c,k,6}$ are set. These variables correspond to constraints (6) that ensure the vehicles don't overlap in the following stage. To force vehicle i ahead of j at time step k, set $b_{c,k,6}=1$. Setting, $b_{c,k,5}=1$ forces j ahead of i. To match the travel order of vehicles i and j to their trajectories in the heuristic solution, the time interval when both vehicles are entirely in the sub-path simultaneously is identified. This determines the sequence of time steps $\{k_s, \ldots, k_f\}$ at which the binary variables are set to values that enforce the desired order. To enforce the travel order of vehicles in model C, the following constraints are added:

$$\forall c \in C_{subpath}, k \in \{k_s, \ldots, k_f\}$$

$$b_{c,k,5} = \bar{b}_{c,k,5}$$

$$b_{c,k,6} = \bar{b}_{c,k,6} \qquad (11)$$

For intersections, similar constraints are added for the binary variables corresponding to constraints (4)-(5).

The heuristic solver used here to identify vehicle orders, also identifies the timing of the constrained binary variables. This is possible because the heuristic generates dynamically feasible trajectories. An alternative method could be used to select the travel order, but if it does not account for the dynamics of the vehicles, the selected order may be infeasible. In practice this may not be an issue as some off-the-shelf optimisers (e.g. Gurobi) will identify infeasible optimisation models, leaving the option to retry with a different order.

6 Lazy Interaction Constraints

When multiple vehicles are traversing a road network, in general they will not interact during parts of their trajectories. Rather than the typical approach of applying interaction constraints at all time steps, their use can be reduced by only applying them at essential times.

6.1 Iterative Constraint Application

Algorithm 1, which is programmed as instructions of program 70 of vehicle coordination assembly 33, targets the timing of interaction constraints in the MILP model by applying them in a lazy fashion. The algorithm begins by creating a relaxed MILP model on line 3 without avoidance constraints. Optimising the model (line 4) results in trajectories S which may have active interactions $C_{active}$. These are identified on line 5, and avoidance constraints are added for each one on line 8. The model is re-optimised on line 9 and the process is repeated until no active interactions remain (line 6).

Line 7 selects a sequence of time steps $K_c = \{k_1, \ldots, k_n\}$ to apply collision avoidance constraints (4)-(8) to interaction c, resulting in a set of sequences $K = \{K_c | \forall c \in C\}$ for all interactions. The authors' previous work Gun et al. (2018) explored various strategies to select time step sequence $K_c$. One strategy is to include every step in the time interval when an active interaction occurs, labelled the narrow interval strategy in Gun et al. (2018). The strategy found to have the shortest computation time was the predictive strategy, which is adopted here due to its performance. Optimal solutions returned by the algorithm are feasible in the monolithic MILP model M, and therefore also optimal to it.

---

Algorithm 1 Iterative lazy interaction constraint MILP

1: Input: Network $G$ ($V$, $\varepsilon$), Vehicles $I$ with paths $P$
2: Output: Vehicle trajectories S
3: $\mathcal{M} \leftarrow$ RelaxedMultiMILP($G$, $P$)
4: $S \leftarrow$ Optimise($\mathcal{M}$)
5: $C_{active} \leftarrow$ ActiveInteractions(S)
6: while $C_{active} \neq 0$ do  ▷ While active interactions remain
7:    $\mathcal{K} \leftarrow$ InteractionTimes(S)
8:    $\mathcal{M} \leftarrow$ AddAvoidanceCons($\mathcal{M}$, $\mathcal{K}$)
9:    $S \leftarrow$ Optimise($\mathcal{M}$)
10:   $C_{active} \leftarrow$ ActiveInteractions(S)
11: return S

---

6.2 Predictive Lazy Constraints

The predictive timing strategy is implemented in Algorithm 2 which is programmed as instructions of program 70 of vehicle coordination assembly 33. Algorithm 2, which is called in line 7 of Algorithm 1, and returns time steps K. Its purpose is to reduce the number of iterations of Algorithm 1, and hence the overall computation time compared to timing methods which add avoidance constraints myopically. It achieves this by essentially acting as an approximation of Algorithm 1, and preempting the addition of interaction constraints.

Algorithm 2 takes a set of vehicle trajectories S and applies a fast heuristic to resolve the active interactions one at a time. During the process of solving, intermediate active interactions are identified and their timing serves as an estimate of the active interactions that would be identified by future iterations of Algorithm 1.

The algorithm begins by identifying the set of active interactions $C_{active}$ that trajectories S will cause on line 3. The narrow timing strategy is used on line 6 to select time steps added to $K_c$. The timing strategy would end here without the predictive elements of the remaining lines, which iteratively resolve interactions and estimate the timing of new ones.

Line 8 selects one active interaction to resolve. In practice, the earliest interaction in time was used. Line 9 resolves the interaction by modifying one of the two interacting trajectories: $s_i$ for agent i, which replaces the old trajectory on line 10.

The active interaction set $C_{active}$ is updated on line 11. When a trajectory is modified, it may cause an interaction with another vehicle that was previously inactive to become active. Line 12 identifies agent i's newly active interactions $C_{new}$, and for each one adds time steps to $K_c$ on line 15.

Similarly, line 13 retrieves agent i's interactions that were active previously $C_{prev}$. For each one, line 17 identifies the time steps when the new trajectory $s_i$ crosses their shared area, and adds them to $K_c$. The reasoning is that a previously active interaction can easily become active again at a different time interval. Optimising the MILP model often results in these types of trajectories if they have a lower cost, and the avoidance constraints are not extended to the new time interval where the vehicles cross the shared area.

An active interaction is made inactive by modifying one vehicle trajectory (line 9) while all others remain unchanged. The two interacting vehicles are given high and low priorities, and a new trajectory is calculated for the low priority vehicle. The calculation is repeated after swapping the priorities. The priority setting causing the smaller effect on solution cost is selected.

| Algorithm 2 Interaction prediction algorithm |
| --- |
| 1: Input: Vehicle trajectories S |
| 2: Output: Time steps $\mathcal{K}$ |
| 3: $C_{active} \leftarrow$ ActiveInteractions(S) |
| 4: $C_{new}, C_{prev} \leftarrow 0$ |
| 5: for all $c \in C$ do |
| 6: $\quad \mathcal{K}_c \leftarrow$ ActiveTimeSteps(c) |
| 7: while $C_{active} \neq 0$ do $\quad \triangleright$ While active interactions remain |
| 8: $\quad c \leftarrow$ SelectActiveInteraction($C_{active}$) |
| 9: $\quad s_i \leftarrow$ ResolveInteraction(c) |
| 10: $\quad S[i] \leftarrow s_i \quad \triangleright$ Update solution set |
| 11: $\quad C_{active} \leftarrow$ ActiveInteractions(S) |
| 12: $\quad C_{new} \leftarrow$ NewActiveInteractions(i) |
| 13: $\quad C_{prev} \leftarrow$ PreviousInteractions(i) |
| 14: $\quad$ for all $c \in C_{new}$ do |
| 15: $\quad\quad \mathcal{K}_c \leftarrow$ ActiveTimeSteps(C) |
| 16: $\quad$ for all $c \in C_{prev}$ do |
| 17: $\quad\quad \mathcal{K}_c \leftarrow$ CrossingTimeSteps(c, i) |
| 18: return $\mathcal{K}$ |

Trajectories are modified by shifting (delaying) them forward in time by the minimum necessary amount to make the interactions inactive. For an intersection, the delay is the difference between the high priority vehicle's intersection exit time, and the low priority vehicle's entry time. For a sub-path, a delay value is calculated for each position where the two vehicles are overlapping. Each of these delays equals the time when the high priority vehicle's rear crosses the position minus the time when the low priority vehicle's front crosses it. The delays for all positions are compared, and the largest is the minimum required to avoid the interaction.

Figure 14A:
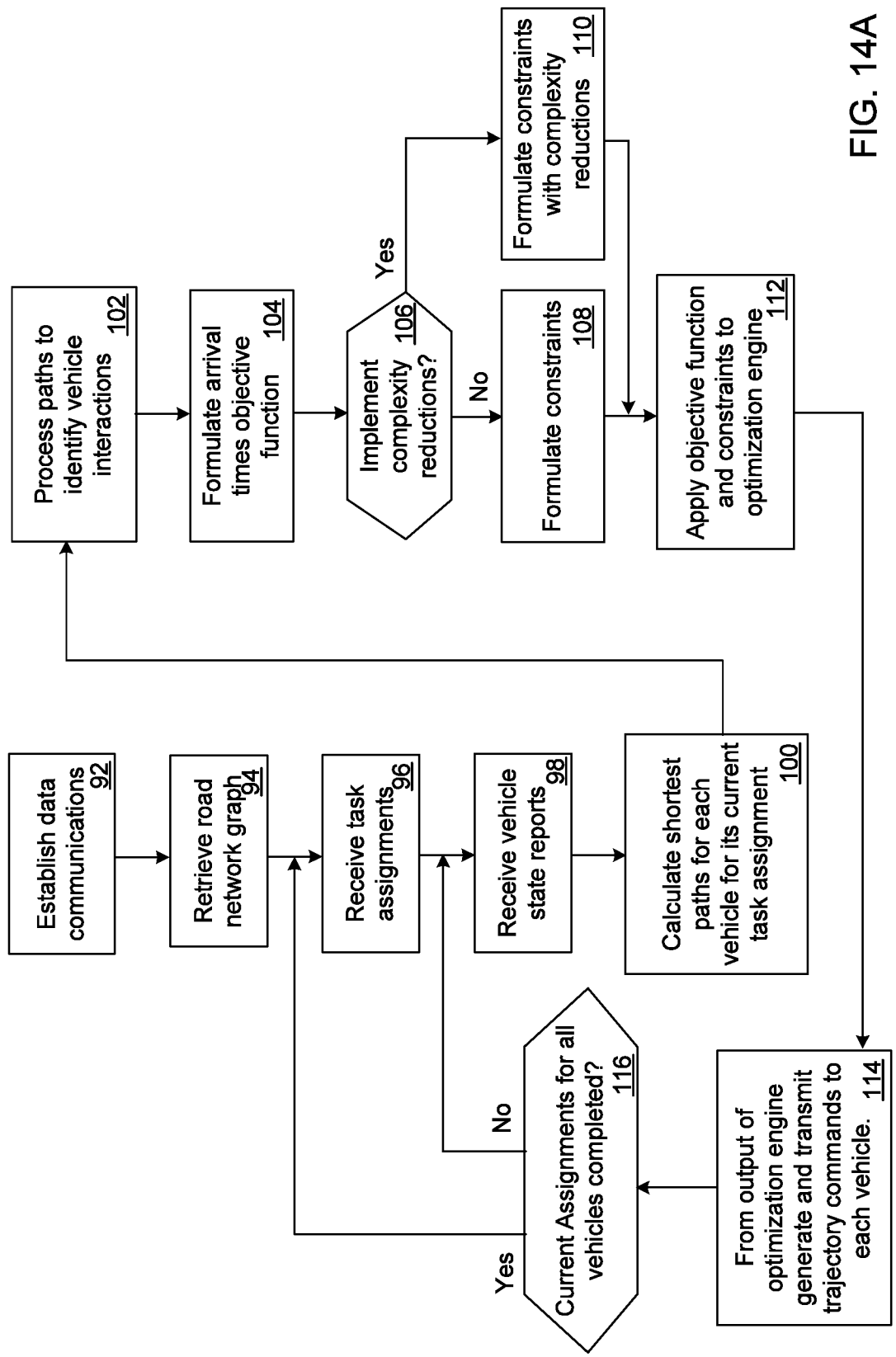
FIG. 14A Is a flowchart setting forth steps in a method according to an embodiment which is implemented by the vehicle control coordinator of FIG. 4.

FIG. 14A is a flowchart of a method performed by vehicle coordination assembly 33 as configured by program 70, in accordance with a preferred embodiment of the present invention.

Initially at box 92, the server 33 operates its communication port 52 to establish data communications via data network 31 with the task assignment allocator 55 and with vehicle communication systems 36 of each of the haul trucks 2-1, . . . , 2-I.

At box 94 server 33 retrieves the road network graph 83 from database 72 in preparation for accessing the edges and nodes of the graph for referencing with task assignments 25 received from the task assignment allocator 55. At box 96 the server receives the task assignments 25 for each vehicle 2-1, . . . , 2-I via communications port 53. At box 98 the server 33 receives the vehicle state messages 21 across data network 31 from each of the vehicles 2-1, . . . , 2-I.

At box 100 the server 33 calculates the shortest paths for each vehicle for its current task assignment by using a shortest paths procedure, for example the procedure described by E. W. Dijkstra (1959). At box 102 the server processes the paths to identify vehicle interactions due to path intersections and shared sub-paths as discussed in section 3.1 herein.

At box 104 the server formulates an arrival times objective function (Eqn 1) for all vehicles and for each step of each path for each vehicle.

At box 106 the server checks to determine if complexity reductions should be implemented for the constraints that will be formulated for the objective function. For example, if the road network graph 83 is quite small and has very few intersections and potentially shared sub-paths then it may not be necessary to implement complexity reductions in order to solve the objective function in a practical timeframe. The decision whether or not to implement complexity reductions may be made automatically, for example depending on the graph complexity, or manually by the operator 67 inputting a command to that effect via keyboard 79 and mouse 51.

If the decision made at box 106 is that no complexity reductions are required then control diverts to box 108 at which the constraints are calculated according to Equations 2-8. Alternatively, if the decision made at box 106 is that the complexity reductions are required then control diverts to box 110 and the constraints are calculated according to one or more of the complexity reduction methods described in sections 5-6 herein.

At box 112 the objective function of box 104 and the constraints of box 108 or box 110 are applied to the optimization engine 71.

At box 114 the outputs from the optimization engine which comprises an acceleration parameter for each vehicle is packaged into a corresponding trajectory command 23 that is then sent to corresponding vehicles via network 31. Upon receiving the trajectory commands 23 the vehicles 2-1, . . . , 2-I, positively accelerate or negatively accelerate (i.e. brake) in accordance with the commands and thus avoid active interactions at the intersections (e.g. intersection 3 of FIG. 4) and shared sub-paths (e.g. sub-path 5 of FIG. 4).

At box 116, if the current assignments for all of the vehicles have not been completed then control diverts to box 98 where the incoming vehicle state messages are continued to be received and processed in respect of current task assignments.

Alternatively, if at box 116, it is determined that the current assignments 23 for all of the vehicles have been completed then control diverts to box 96 where the previously described method repeats in respect of new task assignments.

7 Experiments and Results

To test the performance of the presented methods, experiments simulate vehicles travelling on both toy and mine-like road networks. The computation times of these methods are compared, including the effect of the MILP modifications of Section 5 and lazy constraint algorithm of Section 6. The solution costs of the MILP methods are compared to a method that mimics the behaviour of vehicles in real scenarios.

The following sections mention several different MILP methods. The baseline model M was introduced in Section 4. In contrast, a modified MILP refers to the additional application of complexity reduction constraints (11) and (12) to M. An Ordered MILP means only the application of constraints (12) with predetermined vehicle travel orders. If the MILP model is referred to as iterative, then Algorithm 1 of Section 6 is used to find a solution. Otherwise it is solved directly, and is monolithic. The relaxed solution is model M without collision avoidance constraints (4)-(8).

7.1 Scenario Set-Up

Two types of road network scenarios are tested. The first is a toy scenario with a road network similar to FIG. 9, but with multiple vehicles merging from separate roads onto one sub-path, then diverging onto separate roads. For each instance, road sections are randomly assigned to between 200-210 m. The second scenario type uses a realistically sized, mine-like road network containing 348 nodes and 721 connecting edges. The structure of this network is shown in FIG. 3. Each test case randomly selects paths generated from trips taken by real haul trucks in the past.

MILPs are optimised with Gurobi 8. For each optimisation problem, a 1% optimality gap was set as a termination criteria, and a maximum optimisation time of 120 seconds unless otherwise stated. If a solution was not found within that time, the method is considered to have failed. All vehicles are identical, with models approximating mining haul trucks: Lengths 15 m; mass 200 t; coefficient of rolling resistance 0:08; maximum and minimum accelerations ±0.4 m/s$^2$; and maximum speed of 11 m/s. Time step durations $\Delta t$ for all experiments were set at 1 s. All vehicles begin traversal simultaneously. Experiments were run on a PC with Windows 7, Intel Core i7-4810MQ 2.8 GHz CPU, 16 GB RAM.

7.2 Toy Cases

This section describes the effect of the two complexity reduction techniques of Section 5 on computation time. In both cases Algorithm 1 is used to solve an MILP model M modified by one of the techniques.

7.2.1 Binary Variable Resolution

Figure 15:
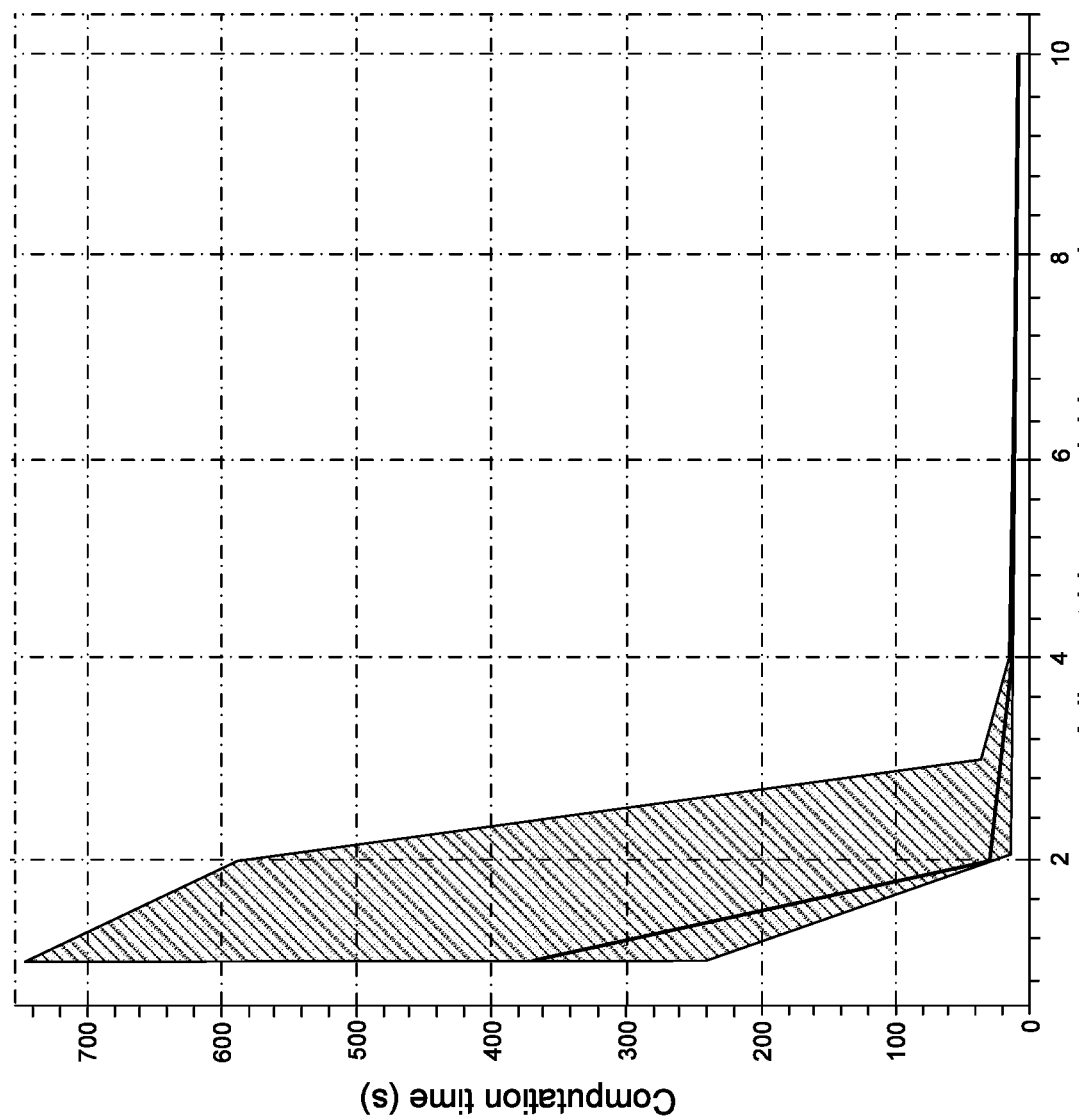
FIG. 15 Is a graph of computation time (s) of solving M for a range of adjacent binary variable group sizes. Line represents medians of within each group of 30 Computation time (s) of solving M with and without set travel orders over a range of vehicle quantities. Medians shown within groups of 30 cases, with 25% and 75% quantiles.

FIG. 15 plots the computation time when using model M with the additional application of constraints (11) over a range of group sizes $\overline{|\alpha|}$. More particularly FIG. 15 represents computation time (s) of solving M on a range of adjacent group sizes. The solid line represents medians within each group of 30 cases. Bands represent 25% and 75% quantiles.

A toy scenario (FIG. 9) with six vehicles rather than two is tested. For each group, 30 tests were run without a computation time limit. As the group size increases starting from one (no grouping), computation times decrease rapidly, but with each group size increment, the effect diminishes. This is likely because each increment has a smaller relative effect on the search space than the last. For example, the number of binary variables halves between groups of size one to two, but reduces by one third between two to three.

These results are indicative of the effect of grouping adjacent binary variables on computation time. However, the precise relationship between group size and computation time is believed to depend on problem parameters such road segment lengths and velocity bounds. Nevertheless, these results may be used to guide group size selection on experiments in Section 7.3.

7.2.2 Predetermined Vehicle Order

Figure 16:
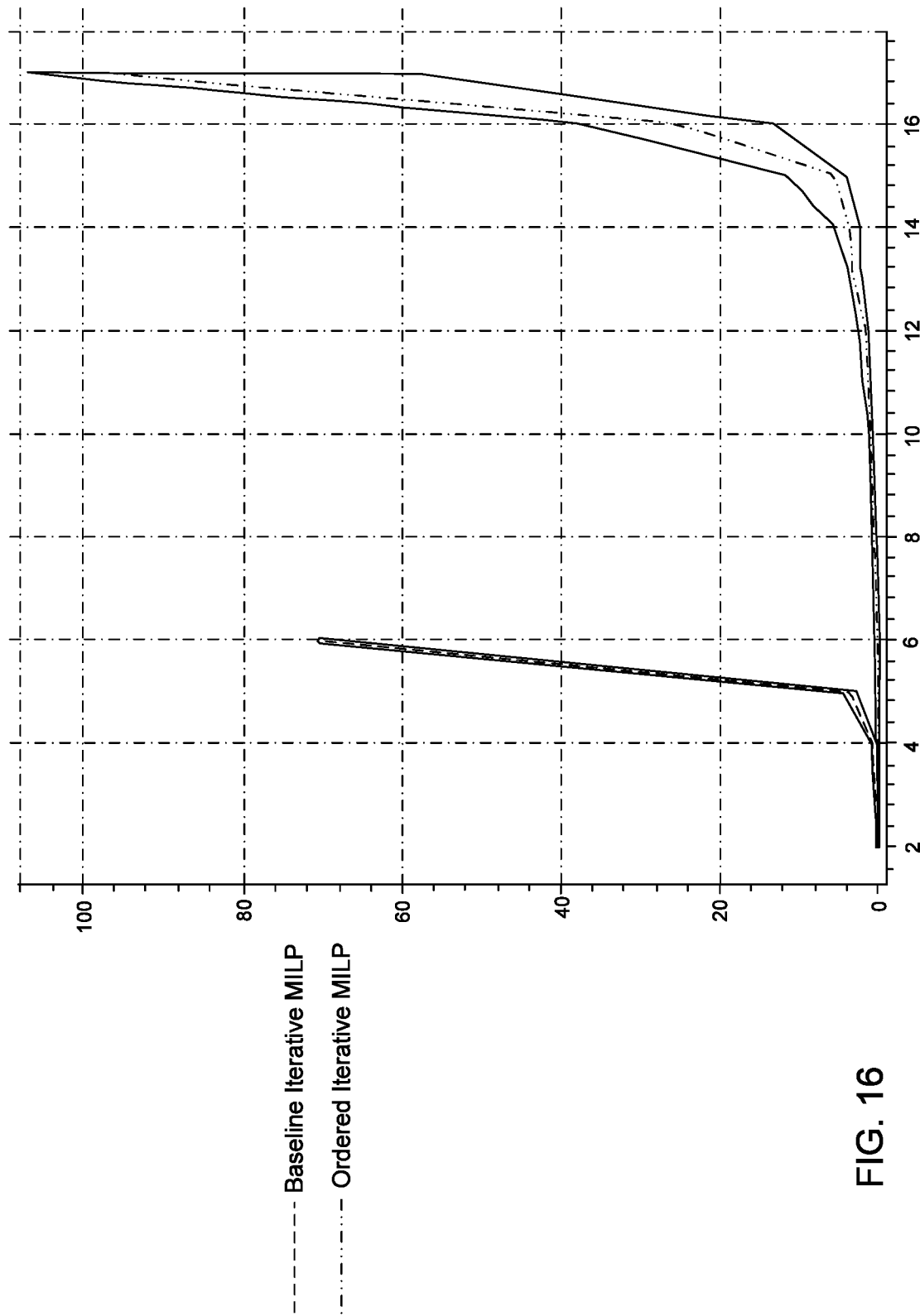
FIG. 16 Is a graph of computation time (s) of solving M with and without set travel orders over a range of vehicle quantities. Medians shown within groups of 30 cases, with 25% and 75% quantiles.

FIG. 16 shows the effect of applying constraints (12) to M on computation time. It shows the Computation time (s) for solving M with and without set travel orders over a range of vehicle quantities. Medians are shown within groups of 30 cases, with 25% and 75% quantiles.

The toy scenario is used, increasing the number of vehicles from 2 to 20. Without order setting, the computation time rises rapidly at cases with five vehicles, with most six vehicle cases failing to find solutions within the 120 s limit. Pre-setting travel orders significantly decreases the computational load and sees timeout failures begin at 17 vehicles. This demonstrates the potential benefit of this technique on computation time and it is expected to also apply with more complex and realistic scenarios, tested in Section 7.3.

7.3 Mine Network

To understand the performance of the presented methods in more realistic scenarios, they are tested with mine-like road networks. To scale up the optimisation problem, the number of vehicles is varied between 2 to 60. The baseline MILP is compared to the modified MILP, which combines both techniques of Section 5. The comparison is then extended by also applying the iterative scheme of Section 6.

Vehicle paths through the mine network cross each other at multiple shared areas, where sub-path and intersection interactions between vehicle-pairs occur. The number of interactions rises with the number of vehicles, up to an average of approximately 1200 for the 60 vehicle scenarios, with a maximum of 1520. The majority of those are at intersections (approximately 800 of the 1200 in the 60 vehicle case). However, less than 10% of interactions are active in the relaxed solutions that ignore collision avoidance. The 60 vehicle cases have an average of 94 and a maximum of 128. The vast majority of the active interactions are on sub-paths. The maximum number of active intersection interactions is 5. This reflects the long path lengths encountered with the scenarios tested: Intersection areas make up a relatively small fraction of the paths, and an encounter between a pair of vehicles at one is unlikely.

7.3.1 Computation Time

Figure 17:
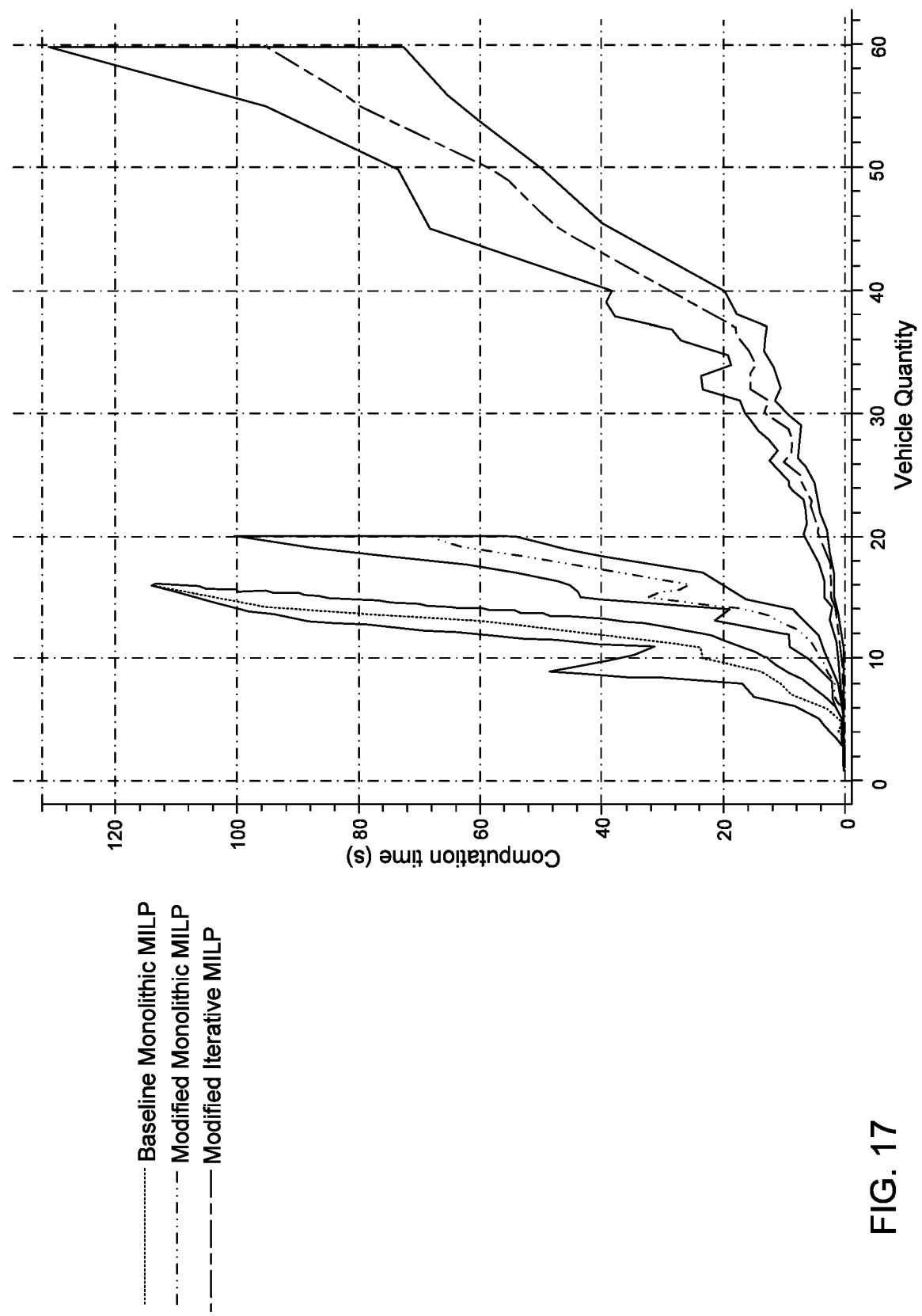
FIG. 17 is a graph of computation time (s) for various methods applied to scenarios with a range of vehicle quantities. Lines represent means within groups with the same vehicle quantities. Bands represent the 25% and 75% quantiles.

The computation times of three MILP methods are compared in FIG. 17. Only results for successfully found solutions are shown. FIG. 17 plots computation time (s) of various methods applied to scenarios with a range of vehicle quantities. Lines represent means within groups with the same vehicle quantities. Bands represent the 25% and 75% quantiles. Lower is better.

It may be observed that all methods increase in computation time as the number of vehicles increases. The baseline monolithic MILP increases the fastest, and is the slowest overall method. The largest optimisation problem it could solve involved 16 vehicles, but it failed on some with as few as 6 vehicles.

The modified monolithic MILP decreased the computation time by up to 10 times, showing the benefit of the two modifications of Section 5. Although the modified method solved some cases with 20 vehicles, it began failing at 14 vehicles. It used adjacent constraint groups of size $\overline{|\alpha|}=5$. The two monolithic methods were only tested on cases with 2 to 20 vehicles.

The modified iterative MILP further reduced the computation time over the modified monolithic MILP by up to 16 times. To better understand its computational limits, this method was tested on larger cases with up to 60 vehicles, and began to fail between 40 to 45 vehicles. As the size of the optimisation problems increase, the computation times of the three MILP methods increase at an increasing rate.

7.4 Solution Costs

Figure 18:
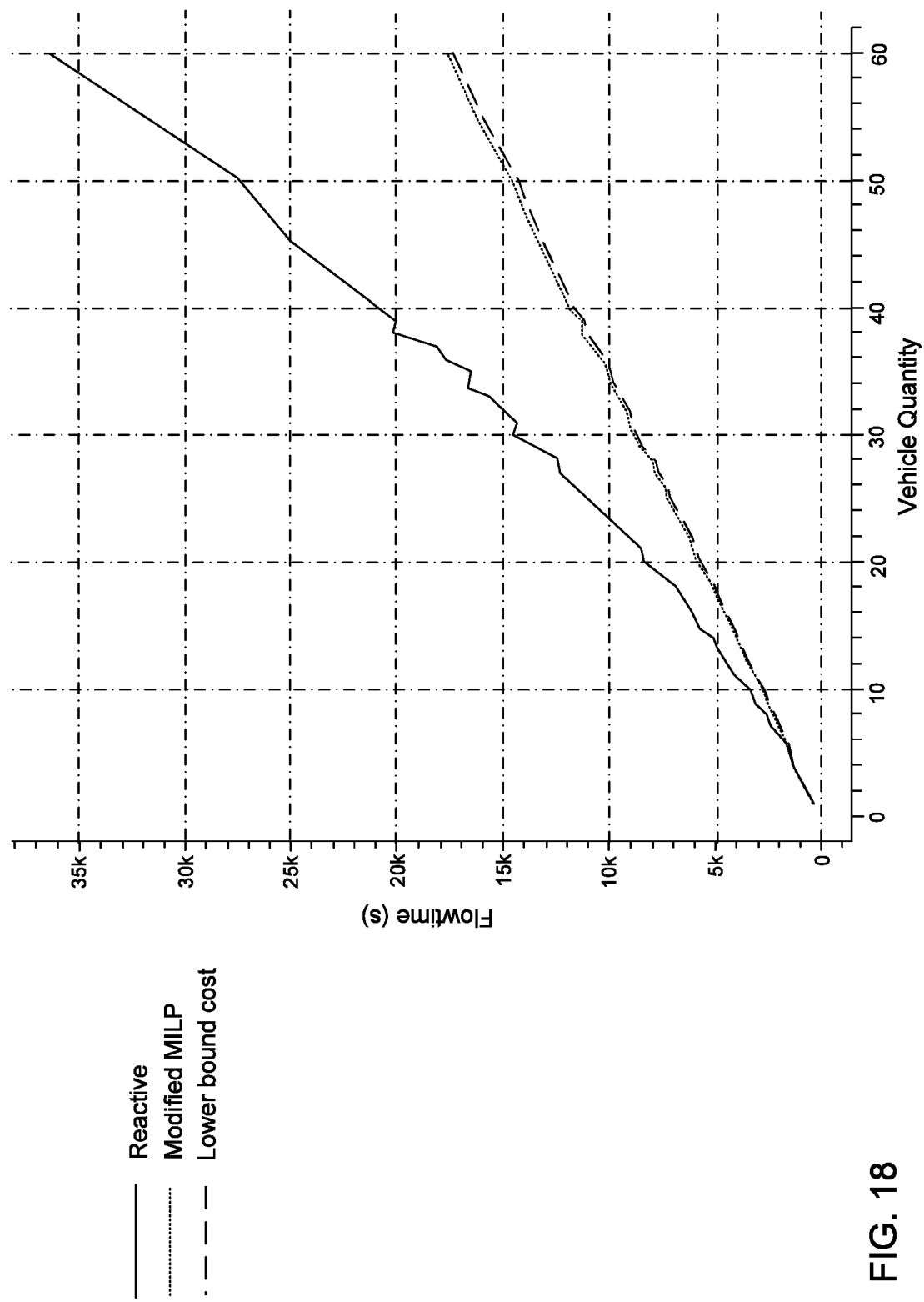
FIG. 18 Is a graph of solution costs (flowtime) of a reactive method (which mimics real vehicle behaviour), a modified MILP and lower bound costs (which relax all collision avoidance constraints).

FIG. 18 compares the solution costs of the modified MILP method with that of a Reactive solver that mimics the behaviour of real haul trucks on mine sites. This involves vehicles slowing down and stopping while approaching an intersection when they need to give way to another vehicle. FIG. 18 plots solution costs (flowtime) of the Reactive method (which mimics real vehicle behaviour), the modified MILP and the lower bound costs (which relax all collision avoidance constraints). Lower is better.

Also shown for reference in FIG. 18 are lower bounds on the costs to the optimal solutions, calculated by optimising the relaxed model. This outputs optimal trajectories for individual agents, which would be feasible if they did not need to consider collisions with other agents. Additional costs in other methods' solutions are due to modifying trajectories to avoid collisions (making active interactions inactive). For this reason, the relaxed solution's cost can be used as a lower bound.

Solution costs are measured in terms of flowtime—the sum of vehicle travel times—equal to the value of objective function (1). The costs of the relaxed and modified MILP method rise approximately linearly with the number of vehicles, but the Reactive method's costs rise at a increasing rate. At the largest scenarios tested, the modified MILP method's solutions have less than half the cost of the Reactive method. The modified MILP solutions stick very closely to the lower bound costs, showing that they are close to optimal.

Figure 19:
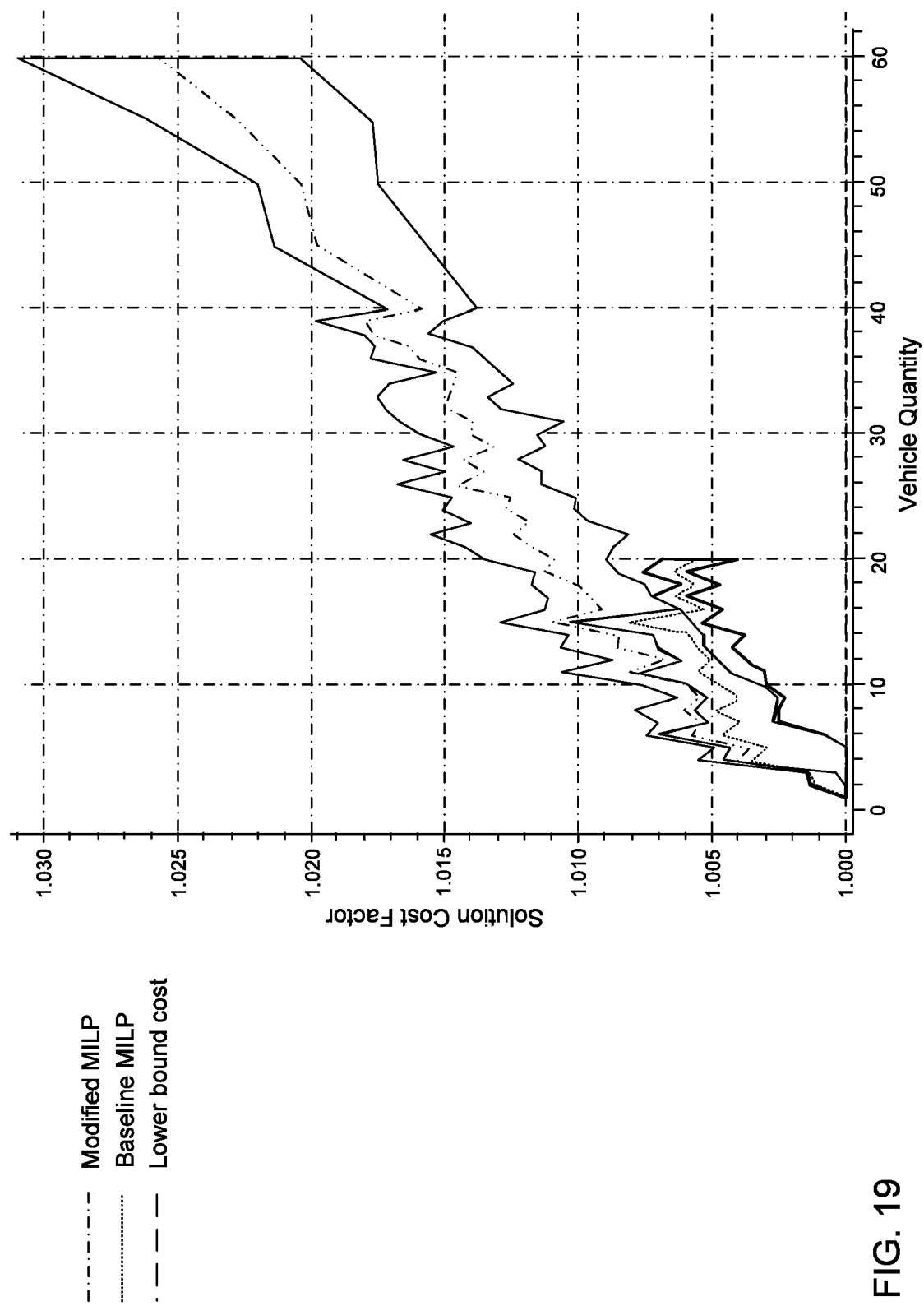
FIG. 19 Is a graph of solution costs as a proportion of the relaxed solution's lower bound.

FIG. 19 shows the cost factor of the baseline and modified MILP solutions relative to the relaxed solutions. The baseline MILP solutions show that additional cost savings are possible relative to the modified MILP, but are very small for the scenarios tested. The biggest average cost reduction by the baseline MILP over the modified version is 0.2%, with a maximum single instance of 1%.

The modified MILP solution cost factors show the optimality gap percentage increasing with vehicle quantity. An additional vehicle will typically add more interactions to a scenario with more vehicles than a scenario with fewer vehicles. The extra interaction complexity provides more opportunities for disruption amongst vehicles. Solving the MILP model within the iterative scheme does not affect its solution cost.

7.5 Discussion

The experimental results (in particular, FIG. 18) show that embodiments of the present invention confer a large improvement in travel time for vehicle fleets that operate on a shared road network, when they can coordinate their motion. The majority of the reduction in solution cost towards optimality was realised in the experiments by using a method that presets the vehicle travel orders with a fast heuristic. Optimising travel orders would save additional travel time, albeit a smaller percentage.

If the computation time results are also considered, then it is apparent that there is a tradeoff between computation time and solution cost. A solution cost lower than the modified MILP can be achieved with the baseline MILP, but requires extra computation time. However, the extra computation time may be justified if the reduction in flowtime is valuable enough. FIG. 19 shows that the gap in the cost factor between the modified and baseline MILPs increases for scenarios up to 20 vehicles. It is conceivable that for scenarios with more vehicles, this gap could reach a meaningful level, and may justify the extra computational resources required to use the baseline MILP method.

For reference, the impact of a 1% flowtime saving is estimated for a 30 haul truck case. Load-haul cycles typically involve two trips to deliver one load of material: One loaded with material, and one empty on the way back. The average number of cycles performed by haul trucks in Australian metalliferous mines is estimated at 3.3 per hour (TASMAN 1998). After accounting for 1 hour of refueling (Bellamy and Pravica 2011), 76 cycles per day equate to 152 trips. Based on FIG. 18, the average flowtime of 30 trucks is approximately 2.5 hours for modified MILP solutions. Extrapolating to a whole day gives 380 hours, and a 1% reduction is 3.8 hours. Over one year the mine's flowtime reduction accumulates to over 57 days.

Embodiments described herein include method to plan trajectories for multiple vehicles using a static road network. One embodiment optimises a MILP that incorporates the motion of all vehicles in the problem simultaneously. To reduce the optimisation time, two modifications of the model are introduced. One of these modifications is guided by a fast heuristic solver to set the relative travel order of vehicles through shared areas, using a first come first serve strategy. Although this increases the solution costs, the reduction in computation time allows larger problem cases to be solved within practical times. The MILP is also used within an iterative algorithm that further reduces the computation time required to find solutions, and allows multiple vehicles to share road segments simultaneously.

Methods according to other embodiments may use different optimisation objectives including energy consumption, wait times of machinery at destinations, and queues at destinations.

REFERENCES

The disclosures of each of the following documents are hereby incorporated herein by reference.

Alonso-Mora J, Beardsley P, Siegwart R (2018) Cooperative collision avoidance for nonholonomic robots. IEEE Transactions on Robotics 34(2):404-420

Altché F, Qian X, de La Fortelle A (2016) Time-optimal coordination of mobile robots along specified paths. In: 2016 IEEE/RSJ International Conference on Intelligent Robots and Systems (IROS), IEEE, pp 5020-5026

Araki B, Strang J, Pohorecky S, Qiu C, Naegeli T, Rus D (2017) Multirobot path planning for a swarm of robots that can both fly and drive. In: Robotics and Automation (ICRA), 2017 IEEE International Conference on, IEEE, pp 5575-5582

Bali C, Richards A (2018) Merging vehicles at junctions using mixed integer model predictive control. In: 2018 European Control Conference (ECC), IEEE, pp 1740-1745

Bellamy D, Pravica L (2011) Assessing the impact of driverless haul trucks in Australian surface mining. Resources Policy 36(2):149-158

Bennewitz M, Burgard W, Thrun S (2002) Finding and optimizing solvable priority schemes for decoupled path planning techniques for teams of mobile robots. Robotics and autonomous systems 41(2-3):89-99

Cap M, Novak P, Kleiner A, Selecky M (2015) Prioritized planning algorithms for trajectory coordination of multiple mobile robots. IEEE transactions on automation science and engineering 12(3):835-849

Debord M, Hönig W, Ayanian N (2018) Trajectory planning for heterogeneous robot teams. In: IROS Dijkstra E. W. (1959) A Note on Two Problems in Connexion with Graphs. Numerische Mathematik 1, 269-271 (1959).

Dresner K, Stone P (2005) Multiagent traffic management: An improved intersection control mechanism. In: Proceedings of the fourth international joint conference on Autonomous agents and multiagent systems, ACM, pp 471-477

Earl M G, D'Andrea R (2005) Iterative MILP methods for vehicle control problems. IEEE Transactions on Robotics 21(6):1158-1167

Earl M G, D'Andrea R (2007) Multi-vehicle cooperative control using mixed integer linear programming. Cooperative Control of Distributed Multi-Agent Systems pp 231-259

Eele A, Richards A (2009a) Multi vehicle avoidance using nonlinear branch and bound optimisation. In: AIAA Guidance, Navigation, and Control Conference, American Institute of Aeronautics and Astronautics, DOI 10.2514/6.2009-5780, URL http://arc.aiaa.org/doi/10.2514/6.2009-5780

Eele A, Richards A (2009b) Path-planning with avoidance using nonlinear branch-and-bound optimization. Journal of Guidance, Control, and Dynamics 32(2):384-394, DOI 10.2514/1.40034, URL http://arc.aiaa.org/doi/10.2514/1.40034

Eele A, Richards A (2010) Rapid updating for path-planning using nonlinear branch-and-bound. In: 2010 IEEE International Conference on Robotics and Automation (ICRA 2010), IEEE, pp 3575-3580, DOI 10.1109/ROBOT.2010.5509732, URL http://ieeexplore.ieee.org/document/5509732/

Erdmann M, Lozano-Perez T (1987) On multiple moving objects. Algorithmica 2(1-4):477

Glorieux E, Riazi S, Lennartson B (2018) Productivity/energy optimisation of trajectories and coordination for cyclic multi-robot systems. Robotics and Computer-Integrated Manufacturing 49:152-161

Gregoire J, Cap M, Frazzoli E (2017) Locally-optimal multi-robot navigation under delaying disturbances using homotopy constraints. Autonomous Robots pp 1-13

Gun P, Hill A, Vujanic R (2018) Improved multi-vehicle trajectory optimisation on road networks. In: Australasian Conference on Robotics and Automation (ACRA), 2018, full text available: https://www.researchgate.net/publication/335013864_Improved_Multi-Vehicle_Trajectory_Optimisation_On_Road_Networks Gun P, Hill A, Vujanic R (2019) Multi-vehicle trajectory optimisation on road networks. In: IEEE International Conference on Robotics and Automation (ICRA), 2019, IEEE Honig W, Preiss J A, Kumar T S, Sukhatme G S, Ayanian N (2018) Trajectory planning for quadrotor swarms. IEEE Transactions on Robotics (99):1-14

Hönig W, Kumar T S, Cohen L, Ma H, Xu H, Ayanian N, Koenig S (2016a) Multi-agent path finding with kinematic constraints. In: ICAPS, pp 477-485

Hönig W, Kumar T S, Ma H, Koenig S, Ayanian N (2016b) Formation change for robot groups in occluded environments. In: Intelligent Robots and Systems (IROS), 2016 IEEE/RSJ International Conference on, IEEE, pp 4836-4842

Kwon R H (2013) Introduction to linear optimization and extensions with MATLAB. CRC Press Li B, Zhang Y, Ge Y, Shao Z, Li P (2017) Optimal control-based online motion planning for cooperative lane changes of connected and automated vehicles. In: 2017 IEEE/RSJ International Conference on Intelligent Robots and Systems (IROS), IEEE, pp 3689-3694

Malone N, Chiang H T, Lesser K, Oishi M, Tapia L (2017) Hybrid dynamic moving obstacle avoidance using a stochastic reachable set based potential field. IEEE Transactions on Robotics 33(5):1124-1138

Miculescu D, Karaman S (2016) Polling-systems-based autonomous vehicle coordination in traffic intersections with no traffic signals. arXiv preprint arXiv:160707896 DOI 10.1007/978-3-642-84537-6_14

Murgovski N, de Campos G R, Sjöberg J (2015) Convex modeling of conflict resolution at traffic intersections. In: Decision and Control (CDC), 2015 IEEE 54th Annual Conference on, IEEE, pp 4708-4713

Peng J, Akella S (2003) Coordinating the motions of multiple robots with kinodynamic constraints. In: Robotics and Automation, 2003. Proceedings. ICRA'03. IEEE International Conference on, IEEE, vol 3, pp 4066-4073

Peng J, Akella S (2004) Coordinating multiple robots with kinodynamic constraints along specified paths. In: Algorithmic Foundations of Robotics V, Springer, pp 221-237

Peng J, Akella S (2005a) Coordinating multiple double integrator robots on a roadmap: Convexity and global optimality. In: Robotics and Automation, 2005. ICRA 2005. Proceedings of the 2005 IEEE International Conference on, IEEE, pp 2751-2758

Peng J, Akella S (2005b) Coordinating multiple robots with kinodynamic constraints along specified paths. The International Journal of Robotics Research 24(4):295-310

Preiss J A, Hönig W, Ayanian N, Sukhatme G S (2017) Downwash-aware trajectory planning for large quadrotor teams. In: Intelligent Robots and Systems (IROS), 2017 IEEE/RSJ International Conference on, IEEE, pp 250-257

Riazi S, Bengtsson K, Wigström O, Vidarsson E, Lennartson B (2015) Energy optimization of multi-robot systems. In: 2015 IEEE International conference on automation science and engineering (CASE), IEEE, pp 1345-1350

Richards A, How J (2005) Mixed-integer programming for control. In: American Control Conference, 2005. Proceedings of the 2005, IEEE, pp 2676-2683

Richards A, How J P (2002) Aircraft trajectory planning with collision avoidance using mixed integer linear programming. In: American Control Conference, 2002. Proceedings of the 2002, IEEE, vol 3, pp 1936-1941

Robinson D R, Mar R T, Estabridis K, Hewer G (2018) An efficient algorithm for optimal trajectory generation for heterogeneous multiagent systems in non-convex environments. IEEE Robotics and Automation Letters 3(2): 1215-1222

Schouwenaars T, Féron E, How J (2002) Safe receding horizon path planning for autonomous vehicles. In: PROCEEDINGS OF THE ANNUAL ALLERTON CONFERENCE ON COMMUNICATION CONTROL AND COMPUTING, The University; 1998, vol 40, pp 295-304

TASMAN A (1998) Benchmarking the productivity of Australia's black coal industry In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described herein comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the scope of the invention.

The invention claimed is:

1. A vehicle coordination system arranged to coordinate trajectories of vehicles on a road network, the vehicle coordination system comprising:
   a plurality of vehicles each having respective vehicle position tracking assemblies in communication with respective vehicle communication systems arranged to transmit vehicle state messages including positions of the plurality of vehicles;
   a task assignment allocator arranged to generate task assignments assigning tasks to each of the plurality of vehicles, the task assignments including destinations in the road network for the vehicles;
   a vehicle coordination assembly in communication with the respective vehicle communication system via a data network for receiving the vehicle state messages, the vehicle coordination assembly configured to:
   determine independent paths for each vehicle to arrive at their destinations, wherein the path for each vehicle is determined independently from the path of every other vehicle in the road network;
   determine trajectory control commands to cause each vehicle to traverse their respective paths whilst optimizing a predetermined objective and avoiding active interactions of two or more of the plurality of vehicles occurring in shared areas of the paths; and
   transmit the trajectory control commands to each vehicle.

2. The vehicle coordination system of claim 1, wherein the vehicle coordination assembly is further configured to identify the shared areas of the paths.

3. The vehicle coordination system of claim 1, wherein the vehicle coordination assembly is configured to determine respective minimum length paths for each vehicle to arrive at their respective destinations.

4. The vehicle coordination system of claim 1, wherein a predetermined objective is to minimize an aggregated traversal time of all vehicles in performance of the task assignments.

5. The vehicle coordination system of claim 1, wherein the predetermined objective is one or more of: minimizing energy consumption of the vehicles;
   minimizing wait times of machinery at the destinations; and
   minimizing formation of vehicle queues at destinations.

6. The vehicle coordination system of claim 1, wherein the trajectory control commands comprise acceleration commands.

7. The vehicle coordination system of claim 6, wherein the plurality of vehicles are configured to respond to the acceleration commands through operation of propulsion systems and braking systems thereof.

8. The vehicle coordination system of claim 7, wherein the vehicles comprise driverless vehicles, each including propulsion and braking systems that are each in communication with their respective vehicle communication system and arranged to apply positive and negative acceleration.

9. The vehicle coordination system of claim 8, wherein the driverless vehicles each include steering systems that are configured to steer said vehicles along their respective paths.

10. The vehicle coordination system of claim 6, wherein the vehicles are arranged for operation by drivers wherein each of the vehicles includes a Human-Machine-Interface responsive to the respective vehicle communication system and arranged to present respective trajectory control messages to respective drivers of the vehicles.

11. The vehicle coordination system of claim 1 wherein the task assignment allocator is arranged to transmit the task assignments to the vehicle coordination assembly via the data network.

12. The vehicle coordination system of claim 1, wherein the predetermined objective is an objective of a Mixed Integer Linear Programming (MILP) discrete time optimization model that encompasses the road network.

13. The vehicle coordination system of claim 12, wherein the MILP includes binary variables modelling interactions of vehicles with the shared areas of the paths.

14. The vehicle coordination system of claim 13, wherein the discrete time optimization model is modified for solution complexity reduction based on a first procedure that computes sub-optimal controls by reducing decision making frequency to reduce resolution of the binary variables while maintaining resolution of continuous state variables.

15. The vehicle coordination system of claim 13, wherein the vehicle coordination assembly is configured to implement an iterative lazy interaction constraint MILP procedure for optimization complexity reduction.

16. The vehicle coordination system of claim 15, wherein the iterative lazy interaction constraint MILP procedure comprises the steps of:
   updating the discrete time optimization model by removing collision constraints therefrom;
   solving the discrete time optimization model to determine vehicle trajectories;
   identifying active shared areas of the vehicle trajectories;
   repeating:
      calculating a sequence of time steps to apply collision avoidance constraints based on active shared areas;
      updating the discrete time optimization model by adding avoidance constraints thereto;
      optimizing the discrete time optimization model to produce updated vehicle trajectories; and
      identify active shared areas of the updated vehicle trajectories;
   until:
      no active shared areas are present in the updated vehicle trajectories.

17. The vehicle coordination system of claim 16, wherein the vehicle coordination assembly is configured to implement a predictive lazy constraint procedure for calculating the sequence of time steps to apply collision avoidance constraints.

18. The vehicle coordination system of claim 17, wherein the predictive lazy constraint procedure includes iteratively making active shared areas inactive by modifying one vehicle trajectory while others remain unchanged.

19. A method for coordinating trajectories of vehicles on a road network, the method comprising:

monitoring positions of a plurality of vehicles via a data network;

receiving task assignments for each of the plurality of vehicles, said task assignments including destinations in the road network for the plurality of vehicles;

processing the task assignments and said positions with reference to topology of the road network to thereby generate paths for each vehicle, wherein the path for each vehicle is determined independently from the path of every other vehicle in the road network;

determining trajectory control commands for each vehicle to traverse its respective path whilst optimizing a predetermined objective and without active interactions of two or more of the vehicles occurring in areas shared by the paths; and transmitting the trajectory control commands across the data network to each vehicle for controlling motion thereof.

20. A method for coordinating trajectories of vehicles on a road network, the method comprising:

processing paths for each of the vehicles to complete tasks assigned thereto to determine trajectory control commands for each vehicle to traverse its respective path to reach its destination whilst optimizing a predetermined objective and without active interactions of two or more of the vehicles occurring in areas shared by the paths, wherein the path for each vehicle is determined independently from the path of every other vehicle in the road network; and transmitting the trajectory control commands across a data network to each vehicle for controlling motion thereof;

wherein computational complexity in optimizing the predetermined objective is reduced by:

grouping time adjacent binary variables modelling interactions of the two or more vehicles in shared areas; or predetermining an order of travel for the vehicles prior to optimizing the predetermined objective; or implementing an iterative lazy interaction constraint procedure.

* * * * *